(12) United States Patent
Vattem et al.

(10) Patent No.: US 11,734,278 B2
(45) Date of Patent: Aug. 22, 2023

(54) CACHE MANAGEMENT FOR MULTIPLE TENANTS

(71) Applicant: salesforce.com, inc., San Francisco, CA (US)

(72) Inventors: Harsha Vattem, Hyderabad (IN); Jayant Kumar, Hyderabad (IN); Gopi Krishna Mudumbai, Hyderabad (IN)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/504,898

(22) Filed: Oct. 19, 2021

(65) Prior Publication Data
US 2023/0117856 A1    Apr. 20, 2023

(51) Int. Cl.
G06F 16/2455    (2019.01)
G06F 16/27      (2019.01)
G06F 16/248     (2019.01)
G06F 16/242     (2019.01)

(52) U.S. Cl.
CPC ...... *G06F 16/24552* (2019.01); *G06F 16/244* (2019.01); *G06F 16/248* (2019.01); *G06F 16/27* (2019.01)

(58) Field of Classification Search
None
See application file for complete search history.

(56) References Cited

U.S. PATENT DOCUMENTS

| 8,447,754 | B2 | 5/2013  | Weissman et al.        |
|-----------|----|---------|------------------------|
| 9,317,430 | B2 | 4/2016  | Soundararajan et al.   |
| 9,880,909 | B2 | 1/2018  | Parakh et al.          |
| 9,959,279 | B2 | 5/2018  | Archak et al.          |
| 9,984,002 | B2 | 5/2018  | Sundaravaradan et al.  |
| 10,152,508| B2 | 12/2018 | Weissman et al.        |
| 10,264,093| B2 | 4/2019  | Dakhane et al.         |

(Continued)

OTHER PUBLICATIONS

Office Action in U.S. Appl. No. 17/505,141 dated Jan. 5, 2023, 14 pages.

(Continued)

*Primary Examiner* — Kim T Nguyen
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed in which a server computer system manages a database cache for multiple different tenants. The system may retrieve, from a database cache storing data for different tenants, a set of key-value entries and cache metadata for the set of key-value entries. Further, the system may identify, based on analyzing keys of key-value entries, tenants corresponding to respective ones of the set of key-value entries. The system may generate, based on the identified tenants and cache metadata for cache entries corresponding to the identified tenants, current usage metrics for the database cache. Based on the current usage metrics for the cache, the system may determine whether to adjust one or more operation parameters of the cache. Disclosed cache management techniques may advantageously allow for analysis of cache usage metrics for individual tenants and more efficient use of the cache (e.g., by altering cache parameters for individual tenants).

20 Claims, 12 Drawing Sheets

(56) References Cited

U.S. PATENT DOCUMENTS

| | | | |
|---|---|---|---|
| 10,853,046 B2 | 12/2020 | Mudumbai et al. | |
| 10,866,894 B2 | 12/2020 | Mudumbai et al. | |
| 10,997,320 B1 | 5/2021 | Aggrawal et al. | |
| 11,316,688 B2* | 4/2022 | Ansari | H04M 15/44 |
| 11,461,243 B2 | 10/2022 | Grisenthwaite | |
| 2006/0026598 A1 | 2/2006 | Handlogten et al. | |
| 2013/0054869 A1 | 2/2013 | Tolia et al. | |
| 2015/0269075 A1 | 9/2015 | Galchev et al. | |
| 2016/0132512 A1 | 5/2016 | Ripberger | |
| 2017/0085669 A1 | 3/2017 | Khakpour et al. | |
| 2017/0344703 A1* | 11/2017 | Ansari | H04L 12/2898 |
| 2018/0267969 A1 | 9/2018 | Shoolman et al. | |
| 2019/0179755 A1* | 6/2019 | Mudumbai | G06F 12/128 |
| 2021/0218571 A1* | 7/2021 | Ansari | H04M 15/705 |
| 2022/0208319 A1* | 6/2022 | Ansari | H04L 9/30 |
| 2022/0318074 A1 | 10/2022 | Kompaniets et al. | |
| 2023/0004564 A1* | 1/2023 | Rochel | G06F 16/24568 |
| 2023/0117856 A1* | 4/2023 | Vattem | G06F 16/24552 707/705 |
| 2023/0118987 A1* | 4/2023 | Vattem | G06F 16/24553 707/769 |

OTHER PUBLICATIONS

Aho et al., Foundations of Computer Science, C Edition—Chapter 10: Patterns, Automata, and Regular Expressions; 1992; pp. 529-590.

Office Action in U.S. Appl. No. 17/505,141 dated May 12, 2023, 17 pages.

* cited by examiner

Cache Usage Metrics Table 510

| Tenant 520 | Total Memory 530 | Total #Keys 540 | Size Distribution 550 | Time-to-Live (TTL) Distribution 560 | Last Read Time 570 | Cache Misses 580 |
|---|---|---|---|---|---|---|
| Einstein | 25KB | 300 | Histogram | Histogram | 10:24:21 | 2 |
| ScaleCache | 2KB | 40 | Histogram | Histogram | 8:10:25 | 10 |
| Industries | 10KB | 120 | Histogram | Histogram | 12:15:00 | 8 |
| Apex | 200KB | 1000 | Histogram | Histogram | 10:24:22 | 0 |

Fig. 5

1000 

Compare at least one key having an unidentified tenant with key segments having a number of occurrences within a database cache satisfying a threshold count, where the at least one key is included in a key-value entry of the database cache storing data for multiple tenants, and where a plurality of key segments and corresponding occurrence counts for the plurality of key segments are stored in a central database.
1010

Determine, based on the comparing, whether the at least one unidentified key matches one of the key segments satisfying the threshold count.
1020

In response to determining a match and based on the matching key segment, identify a tenant corresponding to the at least one unidentified key.
1030

Fig. 10

CACHE MANAGEMENT FOR MULTIPLE TENANTS

CROSS-REFERENCE TO RELATED APPLICATIONS

This application is related to U.S. application Ser. No. 17/505,141, titled "Tenant Identification for Cache Keys," filed on Oct. 19, 2021, which is hereby incorporated by reference as if entirely set forth herein.

BACKGROUND

Technical Field

This disclosure relates generally to database management systems and, more specifically, to managing a database cache providing storage e.g., for multiple different tenants.

Description of the Related Art

Modern database systems routinely implement management systems that enable users to store and retrieve data via a database cache. Implementation of a database cache allows for quick and efficient retrieval of frequently access data, mitigating the need for retrieving data from more long-term storage (which often results in delays in data retrieval). Such database caches, however, generally include a limited amount of storage, and management of this limited storage is implemented via cache parameters such as time-to-live (TTL) values (resulting in eviction of data from the cache), allocated storage size, throttling, etc.

BRIEF DESCRIPTION OF THE DRAWINGS

FIG. 5 is a block diagram illustrating example cache usage metrics, according to some embodiments.

FIG. 10 is a flow diagram illustrating an example method for identifying a tenant corresponding to at least one unidentified key, according to some embodiments.

DETAILED DESCRIPTION

Figure 1:
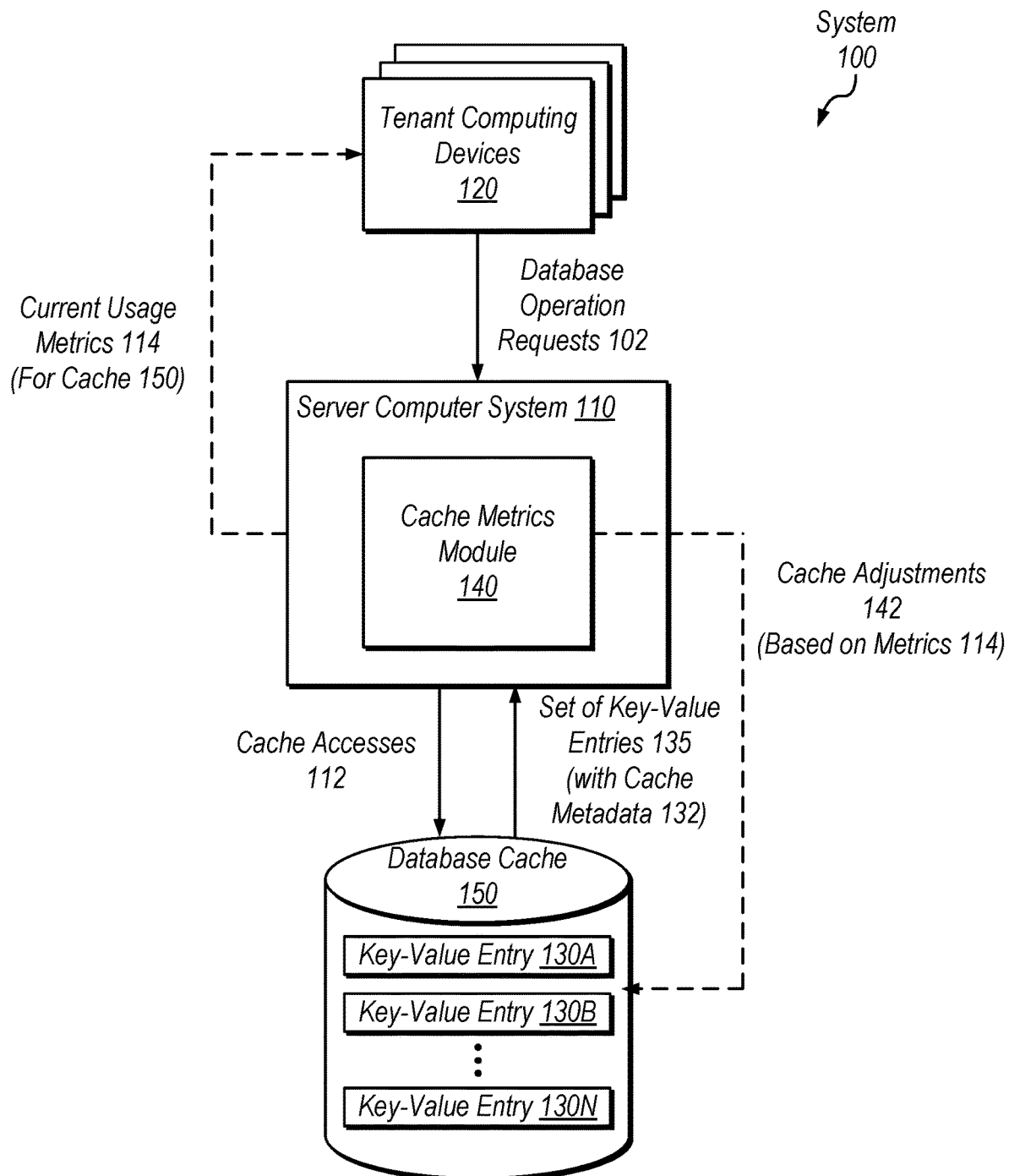
FIG. 1 is a block diagram illustrating an example system configured to maintain a database cache, according to some embodiments.

The present disclosure is generally directed to managing a key-value cache for multiple different tenants in a database (e.g., a multi-tenant database cache) based on identifying and separately analyzing cache metrics for individual ones of the tenants. Identifying and aggregating cache metrics for a given tenant is performed by analyzing the keys of different tenants currently storing data in the key-value cache. In disclosed techniques cache usage metrics may also be referred to as "cache usage statistics." Within the key-value cache, keys are not stored in any particular order and, as a result, it may be difficult to identify which tenants are causing inefficiencies in the cache. Consequently, the disclosed techniques use pattern matching techniques to identify and extract information from the cache regarding individual tenants' access patterns, such that statistical analysis of cache usage as well as tenant-wise cache management may be implemented (e.g., developers of Salesforce™ can identify offending tenants and either the Salesforce™ developers or developers of the tenants themselves can meter cache usage accordingly).

The present disclosure includes a system for performing cache maintenance by continuously retrieving (as new reads or writes to the cache are received) key-value pairs and metadata (e.g., total memory used by this key-value pair, the TTL value of a given key-value pair, cache misses, etc.) from a multi-tenant cache, matching retrieved keys to different tenants using pattern recognition techniques, calculating statistics for identified tenants, and altering the functionality of the cache based on the calculated statistics.

Continuous retrieval of cache metadata may be performed in one of three ways: creating a replica of the cache and pushing all changes made to the original cache to the replica as well (and monitoring activity in the replica), placing a proxy between the cache and various client computer systems, or utilizing an extensible module that monitors operations performed on the cache and relays them to an analytics module for statistical aggregation, or any combination thereof. Utilizing at least one of these three retrieval methods, the present disclosure may advantageously determine cache usage statistics without disrupting the regular flow of data. Further, generating statistical information for the cache usage of individual tenants along with cache metering and regulation may advantageously reduce overall memory requirements for the cache, reduce eviction rates (e.g., by optimizing usage of the cache for individual tenants), etc.

In some situations, the pattern recognition techniques match a portion of the keys retrieved from the database cache, but may not be able to identify one or more other portions of the keys e.g., based on patterns for these keys missing from a database of patterns storing one-to-one mappings between key patterns and tenants. As such, in some situations, pattern matching techniques may not be able to identify tenants corresponding to various cache keys and, consequently, are unable to generate cache usage statistics for a portion of the key-value entries stored in the database cache. This may result in inefficiencies in the cache due to poor usage of this portion of the cache by tenants that are unidentified. For example, if the system is unable to identify tenants corresponding to a portion of the cache and this portion is ultimately causing inefficiencies, then the system is unable to address these inefficiencies by e.g., altering such tenants cache usage parameters.

In order to identify tenants corresponding to keys that did not receive a matching during the pattern matching process, the disclosed techniques perform key segmentation. The disclosed key segmentation techniques compare segments of keys having unidentified tenants with key segments stored in a central database having a threshold number of occurrences in key-value entries within the database cache. Based on a segment of an unidentified key matching a key segment with a threshold occurrence count, the disclosed techniques identify a tenant corresponding to the key with an unidentified tenant. As one specific example, the key "236-c-MessageQueue-10850471" includes the following key segments: "236," "c," "MessageQueue," "10850471." Based on comparing each key segment of this key, to key segments having a threshold number of occurrences in the cache, the disclosed system identifies that the segment "MessageQueue" matches one of the highly-occurring key segments. This matching key segment is then used to identify and assign a tenant for the key "236-c-MessageQueue-10850471." Once keys having unidentified tenants are assigned to corresponding tenants, the disclosed techniques are able to proceed with aggregating cache usage statistics for respective tenants of the cache and adjust cache usage parameters accordingly. Such techniques may advantageously identify all tenants currently utilizing the database cache and, as a result, appropriately adjust cache usage parameters for individual tenants to improve the overall efficiency of the database cache.

Example Database Management System

Turning now to FIG. 1, a block diagram is shown illustrating an example system configured to maintain a database cache. System 100 includes, tenant computing devices 120, database cache 150, and server computing system 110, which in turn includes cache metrics module 140.

In the illustrated embodiment, server computer system 110 receives database operation requests 102 from a plurality of tenant computing devices 120. The database operation requests 102 may specify one or more create, read, update, and delete (CRUD) operations to be performed on the database cache 150. Server computer system 110 maintains database cache 150 for multiple different tenants such that these tenants can quickly retrieve frequently accessed data (e.g., without having to retrieve data from more long-term storage which may introduce delays in data retrieval). Tenant computing devices 120 are associated with various different tenants of server computing system 110. That is, server computer system 110 may be a multi-tenant database management system that manages a multi-tenant cache (one example of database cache 150). Multi-tenant database systems are discussed in further detail below with reference to FIG. 11.

Server computer system 110 performs one or more cache accesses 112 based on database operation requests 102. These cache accesses include get and put operations for the database cache 150. In some embodiments, tenant computing devices 120 access the database cache 150 directly without the assistance of server computer system 110. Tenant computing devices 120 may be referred to as "cache clients." In the illustrated embodiment, server computer system 110 retrieves set 135 of key-value entries and cache metadata 132 from database cache 150. The set 135 of key-value entries could include all entries from the cache 150, could include all entries that have been altered within the past minute, hour, day, etc., could include a subset of the total number of entries that are randomly selected from the cache 150, etc. For example, database cache 150 may store data for a plurality of tenants using a key-value datastore where different tenants have their own unique pattern for their respective keys (e.g., to avoid tenants' keys clashing with one another). In some embodiments, server computer system 110 sends an authorization request to another server (e.g., a database management server) configured to maintain database cache 150. This authorization request may include identification information for server computer system 110. The database management server determines whether server computer system 110 is authorized to retrieve data from the cache. Once it has determined that system 110 is authorized, the database management server sends an authorization message to system 110. System 110 then sends a synchronization request to database management server asking for cache metadata.

Cache metrics module 140 analyzes the keys included in the set 135 of key-value entries retrieved from database cache 150 to identify tenants corresponding to respective ones of the set of key-value entries. For example, cache metrics module 140 identifies that two different keys included in two different entries in the set 135 of key-value entries correspond to a first tenant, while three different keys included in three different entries in the set of key-value entries correspond to a second, different tenant. Example tenant keys are discussed in detail below with reference to FIGS. 2 and 4, while example pattern matching of different tenant keys is discussed in detail below with reference to FIG. 4. Based on identifying different tenants corresponding to the entries in the set of key-value entries and the cache metadata 132, cache metrics module 140 generates current usage metrics for the database cache. Following the example above, cache metrics module 140 may generate current usage metrics for the first tenant (based on the entries identified as corresponding to the first tenant and based on the cache metadata 132 associated with these identified entries) and current usage metrics for the second tenant (based on the entries identified as corresponding to the second tenant and based on the cache metadata associated with these identified entries). Operations performed by the cache metrics module 140 are discussed in further detail below with reference to FIG. 3.

Server computer system 110 determines, based on the current usage metrics generated for database cache 150, whether to adjust one or more operation parameters of the database cache. In some embodiments, server computer system 110 sends current usage metrics 114 generated for database cache 150 to one or more tenant computing devices 120. In some embodiments, server computer system 110 sends instructions to one or more tenant computing devices 120 specifying adjustments these tenants can make to their internal operating parameters of these tenants based on the current usage metrics. For example, server computer system 110 may identify one or more cache inefficiencies caused by a particular tenant and then instruct the particular tenant on various ways to mitigate such inefficiencies (e.g., by altering their program code to more efficiently utilized cache resources).

In some embodiments, server computer system 110 performs one or more cache adjustments 142 to database cache 150 based on the generated current usage metrics 114. For example, server computer system 110 may perform cache adjustments relative to a given tenant or may perform cache adjustments for the database cache as a whole. Example adjustments to the cache include one or more of the following cache operating parameters: an amount of cache space allowed to be used by one or more tenants, time-to-live values, evictions, throttling, etc. As one specific example, the server computer system 110 may adjust the operation parameters of the cache such that data for a given tenant is evicted more quickly than data stored by other tenants in the cache. As another specific example, the server computer system 110 may adjust the cache's operation parameters such that the amount of cache space that a first tenant is allowed to use is less than an amount of cache space that a second tenant is allowed to use at any given time.

In some embodiments, server computer system 110 determines not to adjust operation parameters for the database cache. For example, if the current usage metrics for the cache indicate that the database cache 150 is being used efficiently and that no tenants are hogging cache resources, the system 110 may allow cache operations to continue as usual (at least until system 110 retrieves a new set 135 of key-value entries (e.g., based on new database operation requests 102 being received for the cache 150) and performs a new cache metrics evaluation).

In some embodiments, database cache 150 is a distributed, non-relational database. For example, database cache 150 may include a plurality of distributed cache instances with key-value entries storing data for a plurality of different tenants. Further in this example, shards of database cache 150 may be assigned to various distributed database cache servers. As one specific example, database cache 150 may be a Redis™ datastore.

The disclosed cache evaluation techniques may advantageously assist multiple levels of cache users, e.g., by assisting internal developers of the server computer system 110 to identify offending tenants and govern/meter cache usage for such offending tenants, by assisting tenants in understanding their own individual cache usage statistics (and ultimately to help such tenants optimize their cache usage), etc. Said another way, anomalous cache usage behavior by various tenants utilizing the same database cache may advantageously be identified and, as such, memory requirements and eviction rates for the database cache may decrease, improving the overall performance of the database cache across multiple tenants.

Example Database Cache

Figure 2:
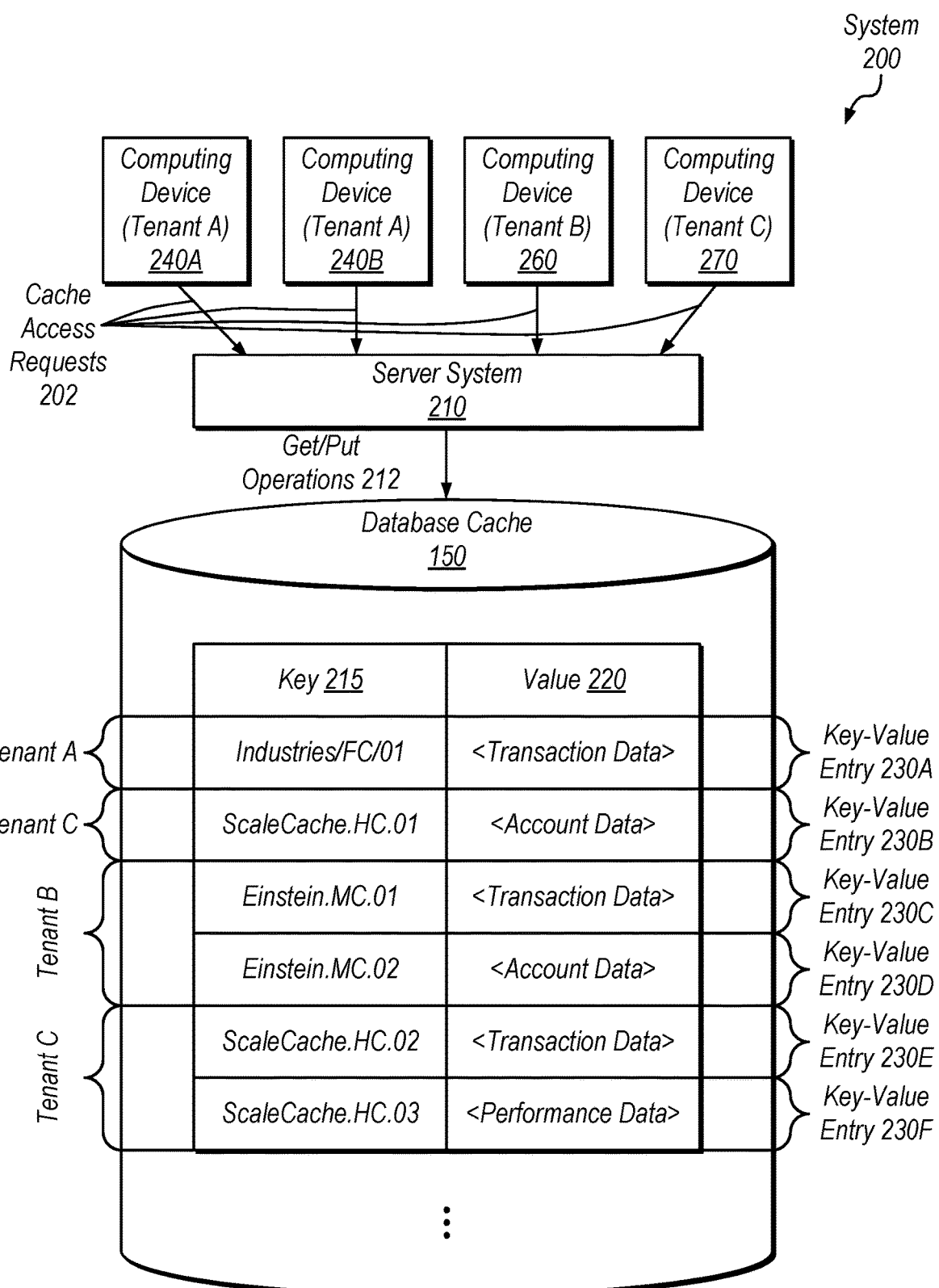
FIG. 2 is a block diagram illustrating an example key-value cache, according to some embodiments.

Turning now to FIG. 2, a block diagram illustrating an example key-value cache. In the illustrated embodiment, system 200 includes computing devices 240A and 240B corresponding to tenant A, computing device 260 corresponding to tenant B, and computing device 270 corresponding to tenant C, server system 210, and database cache 150.

In the illustrated embodiment, server system 210 receives various requests 202 to access data stored in/store new data in database cache 150 from computing devices 240, 260, and 270 corresponding to tenants A, B, and C, respectively. Based on requests 202, server system 210 performs various get/put operations 212 on database cache 150. For example, server system 210 may generate new key-value entries to store new data received from devices 240, 260, and 270. As another example, server system 210 may retrieve data stored in one or more rows of database cache 150 based on a tenant identifier included in cache access requests 202 and a tenant identifier included in the keys 215 of key-value entries 230 within database cache 150.

Database cache 150, in the illustrated embodiment, includes a plurality of key-value entries 230 (rows) storing data for tenants A, B, and C. For example, key-value entry 230A stores transaction data (value 220 for this entry) for tenant A with a corresponding key 215 of "Industries/FC/ 01." Similarly, key-value entry 230B stores account data (value 220 for this entry) for tenant C with a corresponding key 215 of "ScaleCache.HC.01". In the illustrated embodiment, database cache 150 includes three entries for tenant C with three different keys, "ScaleCache.HC.01", "ScaleCache.HC.02", and "ScaleCache.HC.03". The three entries for tenant C are not all stored consecutively, but in some situations may be stored consecutively. The details for identifying the different patterns of keys 215 for different tenants are discussed in detail below with reference to FIG. 4.

Server system 210 is one example of server computer system 110 shown in FIG. 1. In some embodiments, server system 210 is a cache client that provides access to the database cache to a plurality of tenant computing devices. In some situations, a system other than server system 210 communicates with the cache client and performs the disclosed current usage metrics calculations. For example, a proxy may be placed between the cache client and the database cache 150 and this proxy intercepts and stores copies of database operations performed by the cache client on database cache 150 based on e.g., the get and put operations requested by various ones of tenant computing devices 240, 260, and 270. In this example, another system (e.g., server computer system 110 shown in FIG. 1) accesses the proxy to collect the database operation information in order to calculate current usage metrics for database cache 150.

In some embodiments, server system 210 monitors database operations performed on database cache 150 using an extensible server. For example, the extensible server may scrape data from the cache. The server system 210 may receive updates from another server (the extensible server) that is configured to monitor and periodically provide monitored database operations to server system 210. In some situations, server system 210 retrieves key-value entries from database cache 150 for analysis in order to determine current cache usage metrics for different tenants. In this way, server system 210 can capture data about cache 150 and retrieve and process cache usage information without disrupting regular cache operations (e.g., cache access requests 202 and get/put operations 212). In other situations, the extensible server intercepts one or more calls (e.g., get, put, eviction, etc. operations) to the database cache 150 and parses the intercepted metadata in order to update cache usage statistics for one or more tenants. For example, the extensible server monitors activity within the cache as well as external calls made to the cache, including monitoring evictions and TTL expiry limits. In this way, the extensible server (unlike the proxy discussed above) is able to perform both the operations performed by the proxy discussed above as well as the analysis operations of server system 210.

Figure 3:
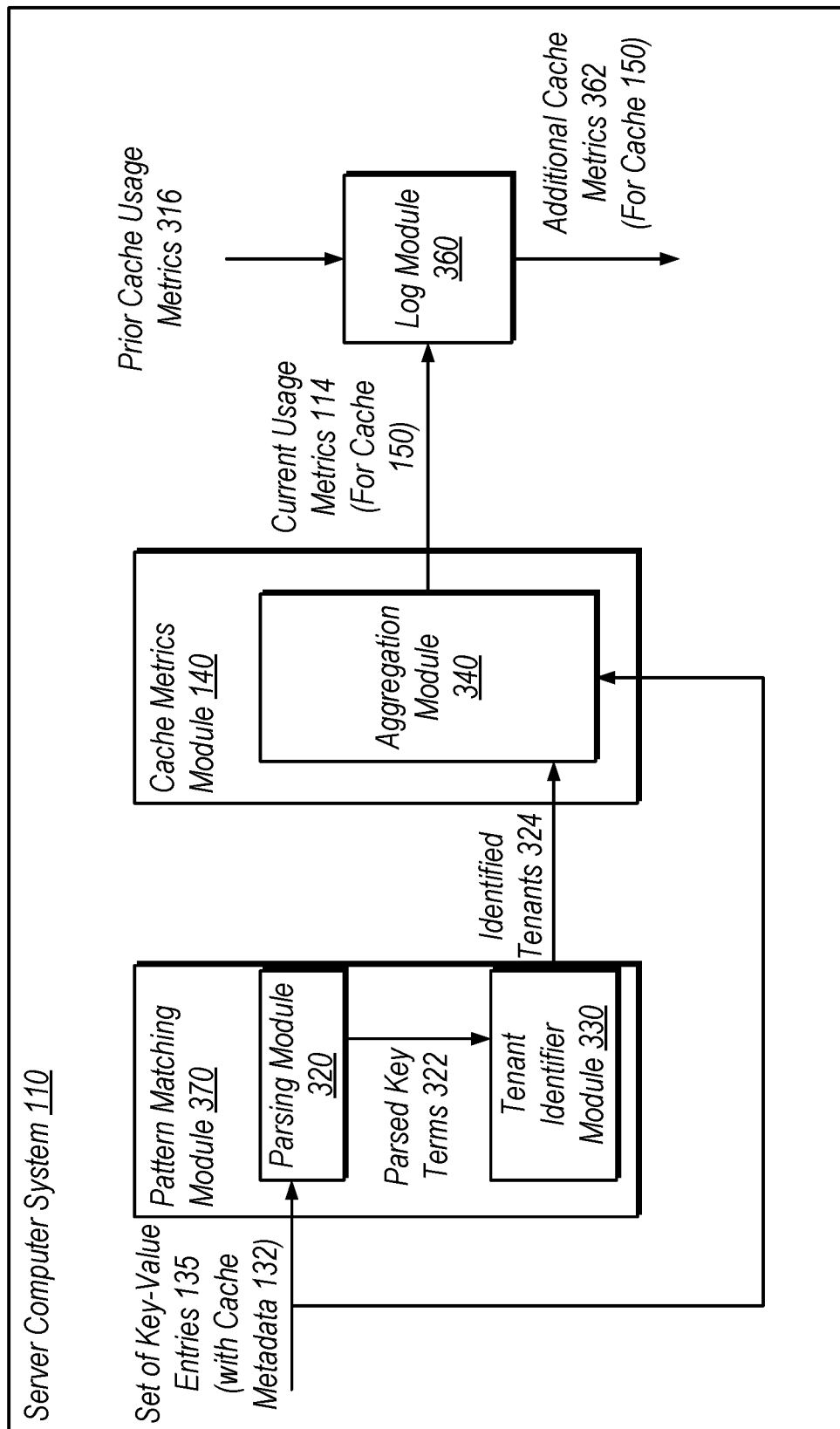
FIG. 3 is a block diagram illustrating example cache metrics module, according to some embodiments.

Turning now to FIG. 3, a block diagram of an example server computer system configured to determine current usage metrics for a database cache. In the illustrated embodiment, server computer system 110 includes pattern matching module 370, log module 360, and cache metrics module 140.

Pattern matching module 370, in the illustrated embodiment, includes parsing module 320 and tenant identifier module 330. Pattern matching module 370 receives a set 135 of key-value entries including cache metadata 132 (e.g., for database cache 150 shown in FIG. 1) and inputs them into parsing module 320. Parsing module 320 parses the keys included in the set 135 of key-value entries to separate portions of the keys (e.g., terms) and sends these separated portions to tenant identifier module 330. Tenant identifier module 330 identifies, based on the parsed key terms 322, tenants 324 corresponding to the keys in respective key-value entries included in set 135.

Cache metrics module 140, in the illustrated embodiment, includes aggregation module 340. Cache metrics module 140 receives information specifying different tenants 324 identified by pattern matching module 370 as corresponding to various keys included in the key-value entries of database cache 150. Cache metrics module 140 also receives the set 135 of key-value entries and cache metadata 132 and generates, via aggregation module 340, cache usage metrics 114 for cache 150.

As one specific example, aggregation module 340 may combine, based on the information received from pattern matching module 370 showing that a first key pattern belongs to a first tenant, cache metadata 132 associated with key-value entries corresponding to the first tenant. In this example, aggregation module 340 combines cache metadata 132 for all of the key-value entries in set 135 with keys that match the first key pattern belonging to the first tenant. Based on the combined metadata for the first tenant, aggregation module 340 generates cache usage metrics for the first tenant and sends these metrics 114 to log module 360. In some embodiments, cache metrics module 140 performs data aggregation for all tenants having keys included in the set 135 of key-value entries. In some embodiments, aggregation module 340 generates current usage metrics 114 for all tenants with keys included in the set 135 of key-value entries instead of or in addition to generating usage metrics for individual tenants. Cache metadata may include one or more of the following types of metadata: total memory used respective key-value pairs, the TTL values of respective key-value pairs, when a given key-value pair was last read from the cache (e.g., based on timestamps for this key), a number of cache misses experienced by respective tenants, etc. Further, the aggregation module 340 may determine, from the last time a given cache entry was read, how long the key corresponding to this entry has been in the system without being called (providing an indication of how much TTL may be reduced for this tenant, for example).

Log module 360, in the illustrated embodiment, receives current usage metrics 114 from aggregation module and prior cache usage metrics 316 and generates additional cache metrics 362 for database cache 150 (shown in FIG. 1). Prior cache usage metrics 316 may include previously aggregated cache statistics for multiple different tenants. For example, prior cache usage metrics 316 may include aggregated metrics for a first tenant from cache metadata retrieved a minute, an hour, a day, etc. before the cache data for the current usage metrics 114 was retrieved. In some embodiments, server computer system 110 sends additional cache metrics 362 to one or more of tenant computing devices 120. In some embodiments, server computer system 110 restricts cache usage for one or more tenants based on the additional cache metrics 362.

Server computer system 110 stores prior cache usage metrics 316 generated for multiple tenants from cache metadata retrieved from cache metadata at multiple different times. For example, log module 360 may store usage metrics for a given tenant that were generated from cache metadata retrieved on a Monday, a Tuesday, a Wednesday, etc. respectively. In some embodiments, server computer system 110 retrieves a continuous (e.g., time-series data) stream of cache entries and cache metadata from database cache 150 and continuously generates and updates current usage metrics 114 for the cache. Server computer system 110, however, does not store a set of raw cache data (e.g., set 135 of key-value entries and cache metadata 132) once this system has finished generating current usage metrics 114 for the set of raw cache data. This may advantageously improve the efficiency of server computer system by decreasing the amount of storage and computing resources necessary to store and maintain data retrieved from database cache 150.

In some embodiments, database cache 150 (shown in FIG. 1) is a distributed database that stores data for multiple tenants across a plurality of distributed caches executed by one or more database servers. For example, a first database server may maintain one or more database cache instances, while a second database server maintains one or more other database cache instances. Further, in this example, database shards are assigned to different database servers. In some embodiments, the first and second database servers a located in different geographic locations. In such situations, the one or more database cache instances may be replications of one another rather than being split across geographic locations. Server computer system 110 may retrieves data from the plurality of cache instances and generate current usage metrics across the plurality of cache instances. For example, server computer system 110 may generate current usage metrics 114 for a first tenant by identifying key-value entries stored across multiple cache instances that have keys corresponding to the first tenant. Server computer system 110 then aggregates the cache metadata corresponding to these identified key-value entries.

Figure 4:
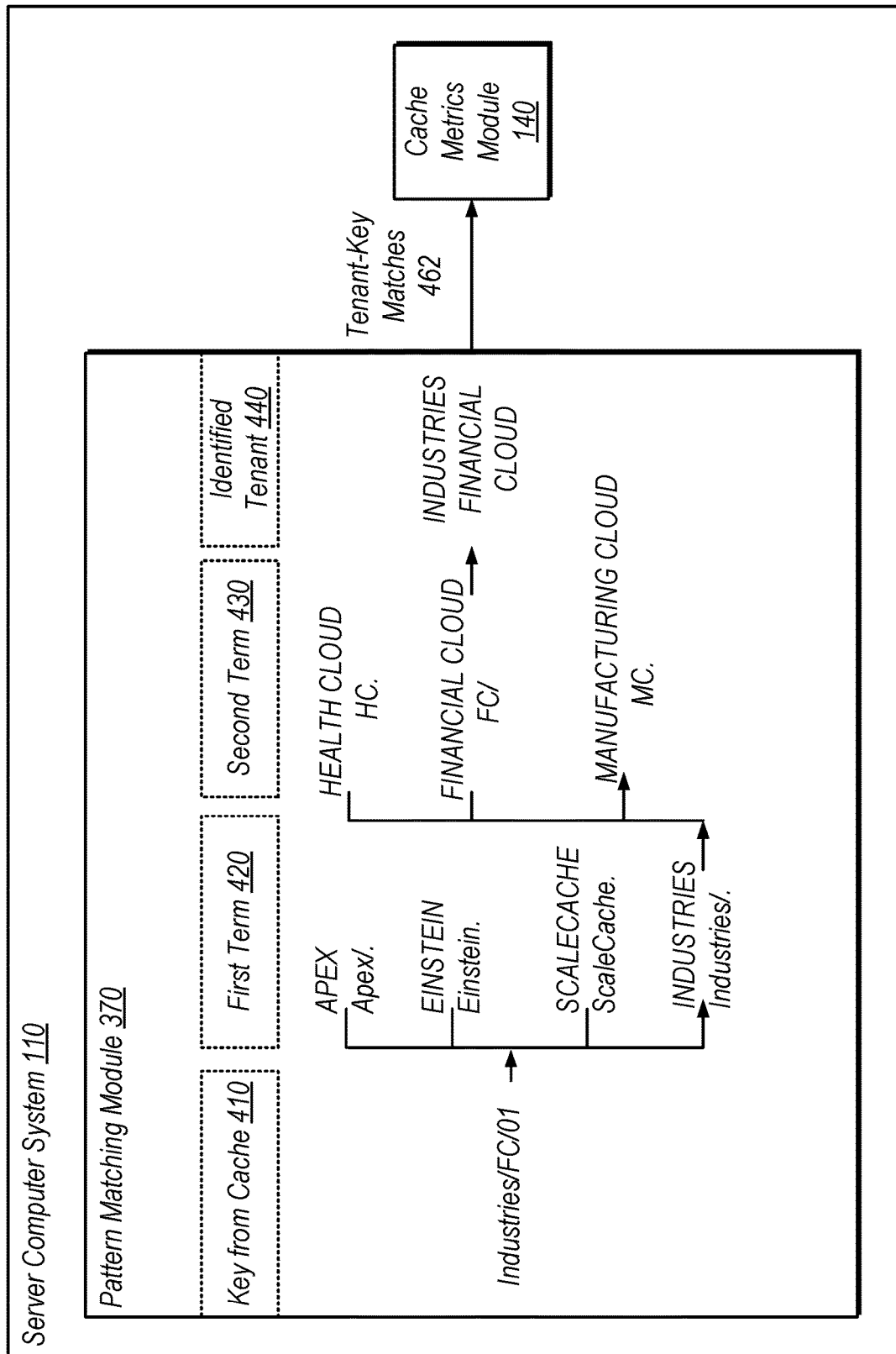
FIG. 4 are block diagrams illustrating example pattern matching module, according to some embodiments.

FIG. 4 are block diagrams illustrating example pattern matching module 370. In the illustrated embodiment, server computer system 110 includes cache metrics module 140 and pattern matching module 460. In the illustrated embodiment, within pattern matching module 370, an example key 410 from e.g., database cache 150 is shown and is parsed to determine at least first term 420 and a second term 430 for the key. Further, an example tenant 440 that pattern matching module 370 has identified as corresponding to key 410 is shown.

In the illustrated embodiment, pattern matching module 370 parses key 410 "Industries/FC/01" to identify a first term 420 included in the key. In this specific example, "Industries/." is the first term included in key 410 and this term indicates that key 410 belongs to a tenant operating within the industries cloud within Salesforce™, for example. Next, pattern matching module 370 parses a second term 430 "FC/" from key 410 and determines that this term indicates key 410 belongs to a tenant operating in the financial cloud of Salesforce™, for example. Pattern matching module 370 identifies that key 410 corresponds to the industries financial cloud of Salesforce™.

Pattern matching module 370 repeats the process shown in FIG. 4 for any of various keys included in key-value pairs retrieved from database cache 150 by server computer system 110. Once pattern matching module 370 has identified tenants to which different keys from the database cache belong, this module sends tenant-key matches 452 to cache metrics module 140. For example, pattern matching module 370 may use regular expressions (e.g., patterns) to match combinations of characters included in a key (a string) to existing key patterns. If character combinations within a given key match a known existing key pattern, then the given key will be identified as belonging to a tenant associated with the known existing key pattern, for example.

Server computer system 110 stores various terms, prefixes, suffixes, etc. (e.g., regular expressions) known to correspond to keys of various tenants in a database (a regular expression database) available to pattern matching module 370. Key patterns of keys included in entries of database cache 150 may include regular expressions. For example, when a tenant is participating in an on-boarding process with server computer system 110, this tenant specifies various clouds, organizations, products, terms, key phrases, etc. with which the tenant might be associated or that the tenant might use when generating their keys. In some situations, a tenant may supply their key pattern (e.g., one or more terms) that the tenant will include in their keys when utilizing the database cache 150 to store their data.

Turning now to FIG. 5, a block diagram of an example cache usage metrics. In the illustrated embodiment, table 510 includes various cache usage metrics for different tenants 520, including total cache memory 530, total number of keys 540, size distribution 550, time-to-live (TTL) distribution 560, last read time 570, and cache misses 580. Although various example cache usage metrics are illustrated in FIG. 5, server computer system 110 may generate and analyze any of various types of cache usage metrics.

In the illustrated embodiment, four different tenants 520 are shown in the far-left column of table 510: Einstein, ScaleCache, Industries, and Apex. Table 510 includes six different types of example cache usage metrics for the four different tenants. In the illustrated embodiment, table 510 shows that the Einstein tenant 520 is currently using 25 KB of memory within the cache (e.g., database cache 150). Further, table 510 shows that the Einstein tenant 520 currently holds 300 different total keys (i.e., 300 key-value entries) within the cache. Table 510 shows that two different histograms (not shown), one for cache size distribution 550 and one for time-to-live value distribution 560, have been generated for each of the four different tenants. Table 510 also includes a last read time 570 of 10:24:21 and a total of two cache misses 580 for the Einstein tenant. Server computer system 110 may transmit the information for individual tenants 520 included in table 510 (including histograms for the two different distributions 550 and 560) to respective tenants corresponding to these cache usage metrics correspond. As one specific example, the information specifying the last read times 570 for various tenant keys may be used to determine how long data has been stored in the database cache (e.g., without being accessed) before this data is evicted from the cache. Determining the time between a last read and final eviction from the cache may be useful in determining whether to update cache parameters for one or more tenants, for example.

Although a limited number of example cache usage metrics are shown in table 510 for four different tenants, in the illustrated embodiment, any of various types of cache usage metrics may be determined for any of various different tenants. For example, cache metrics module 140 (shown in FIG. 1) may determine cache usage metrics for hundreds, thousands, millions, etc. of different tenants including metrics not illustrated in table 510. For example, although current cache usage metrics are shown in table 510 for four different tenants at a given moment in time, table 510 may be continuously updated as time passes to keep these metrics current. As one specific example, these metrics may be periodically updated every minute, hour, day, week, etc. Further, the metrics shown in table 510 may be usage metrics that are averaged over a given period of time. For example, table 510 might show usage metrics for the four different tenants for a given day, week, month, year, etc.

In some embodiments, server computer system 110 adjusts one or more of the following types of operation parameters for database cache 150 for one or more of the tenants identified by pattern matching module 370: usable amount of space, time-to-live values, evictions, and throttling. For example, server computer system 110 may choose to restrict or increase a given tenants cache usage privileges based on identifying inefficiencies in the given tenant's cache usage based on the current cache usage metrics generated for this tenant. As one specific example, server computer system 110 may perform auto-scaling for a first tenant that is using too much of the total memory within the database cache in order to scale down the total amount of cache memory that the first tenant is allowed to utilize. As another specific example, system 110 may identify that the amount of cache storage utilized by a second tenant spikes every Monday and, as a result, system 110 may automatically increase the amount of cache memory the first tenant is allowed to use on Mondays only (to account for the extra storage space that the second tenant requires during peak transaction times, for example). As yet another specific example, system 110 may throttle a third tenant's data more quickly in order to cause the data stored for the third tenant to be evicted from the cache more quickly than other tenants using the cache. In this specific example, throttling data stored in the cache for the third tenant is performed based on the third tenant using an unreasonable amount of cache storage space.

In other embodiments, server computer system 110 works with individual tenants to identify inefficiencies within their cache usage (i.e., based on their cache usage metrics). For example, based on identifying inefficiencies in cache usage, server computer system 110 may assist a particular tenant in introducing optimizations to the program code of the particular tenant in order to improve their overall usage of the cache (e.g., when the particular tenant is causing inefficiencies in the shared cache). In some embodiments, system 110 performs cache metering and governance based on tenant priority. For example, a higher priority tenant (e.g., one that pays a premium for the cache services provided by system 110) may be allocated a greater percentage of the cache storage space than a lower priority tenant (e.g., one that is not paying a premium).

Example Method

Figure 6:
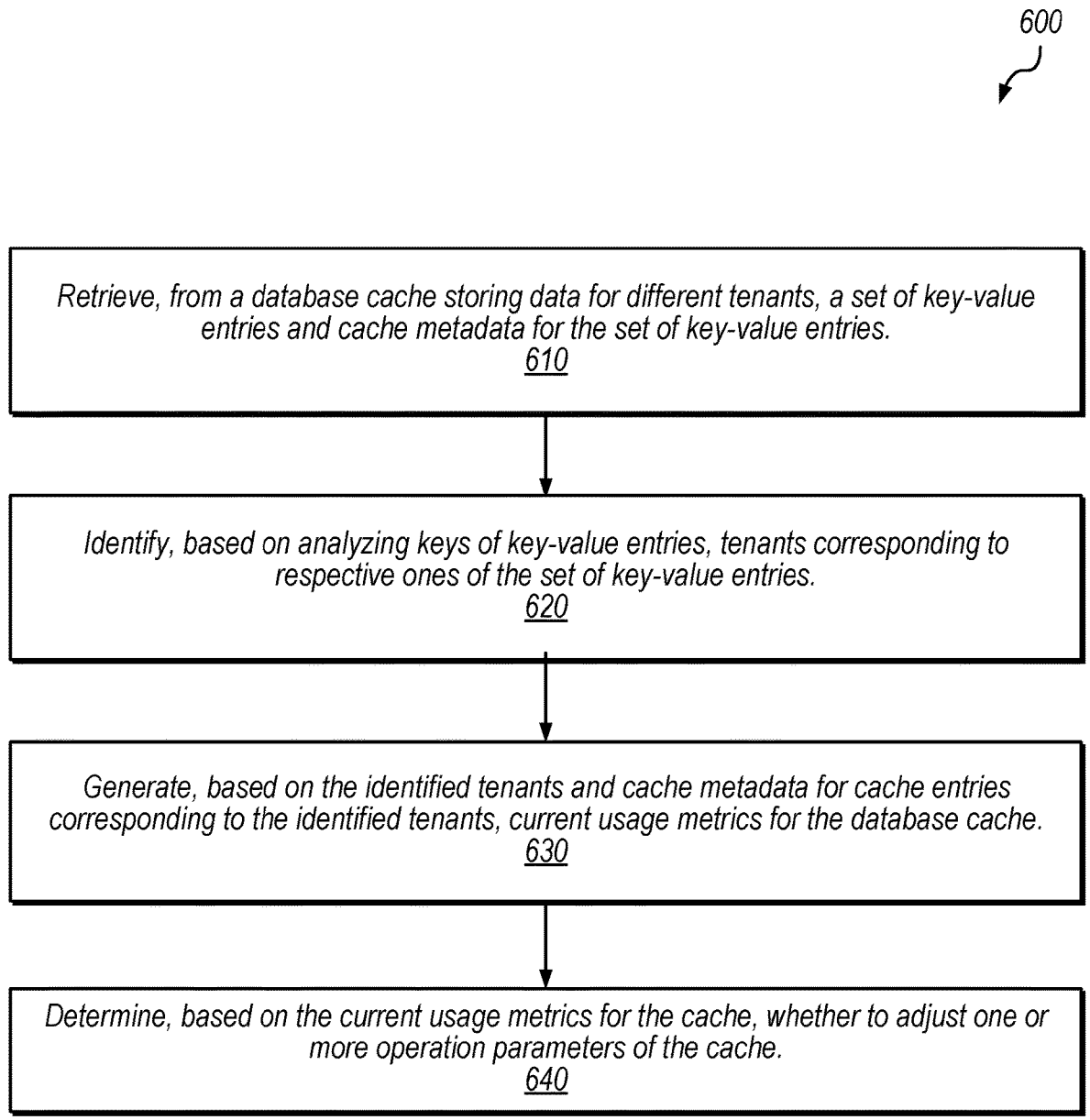
FIG. 6 is a flow diagram illustrating an example method for generating usage metrics for a database cache serving multiple different tenants, according to some embodiments.

FIG. 6 is a flow diagram illustrating a method 600 for generating usage metrics for a database cache serving multiple different tenants, according to some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, server computer system 110 performs the elements of method 600.

At 610, in the illustrated embodiment, a server computer system retrieves, from a database cache storing data for different tenants, a set of key-value entries and cache metadata for the set of key-value entries. In some embodiments, the retrieving is performed by placing a proxy between the database cache and cache client, where the cache client provides access to the database cache to a plurality of tenant computing devices. In some embodiments, the proxy stores a copy of database operations requested by the plurality of tenant computing devices and performed by the cache client. In some embodiments, the retrieving is performed by monitoring, using an extensible server, database operations performed on the database cache and periodically transmitting, from the extensible server to the server computer system, the monitored database operations, where the retrieving is performed based on the monitored database operations.

In some embodiments, the retrieving is performed by generating a replica of the database cache and pushing a plurality of requested database operations performed on the database cache to the replica of the database cache, where retrieving the set of key-value entries and cache metadata includes retrieving information from the replica of the database cache.

At 620, the server computer system identifies, based on analyzing keys of key-value entries, tenants corresponding to respective ones of the set of key-value entries. In some embodiments, identifying tenants includes parsing respective keys included in the plurality of key-value entries retrieved from the database cache to determine one or more separate portions of the respective keys. In some embodiments, identifying tenants further includes matching the one or more separate portions from respective keys to one or more known expressions included in a database of expressions corresponding to different tenants. In some embodiments, the database of expressions is populated by receiving, from a plurality of tenants at a time of registration of the tenants with a service provided by the server computer system, tenant codes. For example, tenant codes may include tenant identifiers, organization identifiers, organization names, names, expressions, etc. for a given tenant. In some embodiments, the database of expressions is further populated by identifying, based on the received tenant codes, one or more expressions corresponding to respective tenants.

At 630, the server computer system generates, based on the identified tenants and cache metadata for cache entries corresponding to the identified tenants, current usage metrics for the database cache. In some embodiments, generating the current usage metrics for the database cache includes aggregating, for respective tenants of the multi-tenant database system (one example of server computer system), current usage metrics. In some embodiments, generating the current usage metrics for the database cache includes periodically updating, based on retrieving one or more additional sets of key-value entries, the aggregated current usage metrics for respective ones of the tenants. In disclosed techniques, current usage metrics may be referred to as current usage statistics.

At 640, the server computer system determines, based on the current usage metrics for the cache, whether to adjust one or more operation parameters of the cache. In some embodiments, the server computer system adjusts based on the determining, one or more types of the following types of operation parameters of the cache for one or more of the identified tenants: usable amount of space, time-to-live values, evictions, and throttling. For example, the server computer system may automatically restrict a tenant's cache privileges based on identifying inefficiencies in this tenant's cache usage.

In some embodiments, the server computer system is a multi-tenant database system. In some embodiments, the multi-tenant database system (such as the MTS 1100 discussed in detail below with reference to FIG. 11) transmits, to a computing device of a first tenant of the multi-tenant database system, instructions for altering one or more internal parameters of the first tenant specifying allowable cache usage for the first tenant, where the instructions are generated based on the current usage metrics for the database cache corresponding to the first tenant.

In some embodiments, method 600 fails to identify tenants for one or more keys included in key-value entries of database cache 150. In such situations, the disclosed techniques perform an additional tenant identification method (such as method 1000 below) using key segmentation to identify tenants for keys that did not receive an identified tenant during performance of method 600. For example, as new tenants begin utilizing database cache 150, the key patterns used by these tenants may not be stored in the regular expression database used to match tenants to keys in the database cache (e.g., we end up missing regular expressions for tenants when these tenants alter their identification codes, invalidating previously known regular expressions for these tenants). In addition, tenants utilizing database cache 150 may alter their key patterns over time, requiring an update to the regular expressions stored in the regular expression database discussed above with reference to FIG. 4. In some embodiments, the disclosed system performs both pattern matching techniques (using the regular expression database) and key segmentation techniques on keys of the database cache. Performance of both techniques on respective database keys may advantageously provide a checks and balance system for verifying mappings between keys and tenants. The following techniques discussed in detail with reference to FIGS. 7-10 provide a method for performing key segmentation for keys of a database cache in order to select key segments usable to identify tenants corresponding to the keys from which the key segments were taken.

Example Segment Identification System

Figure 7:
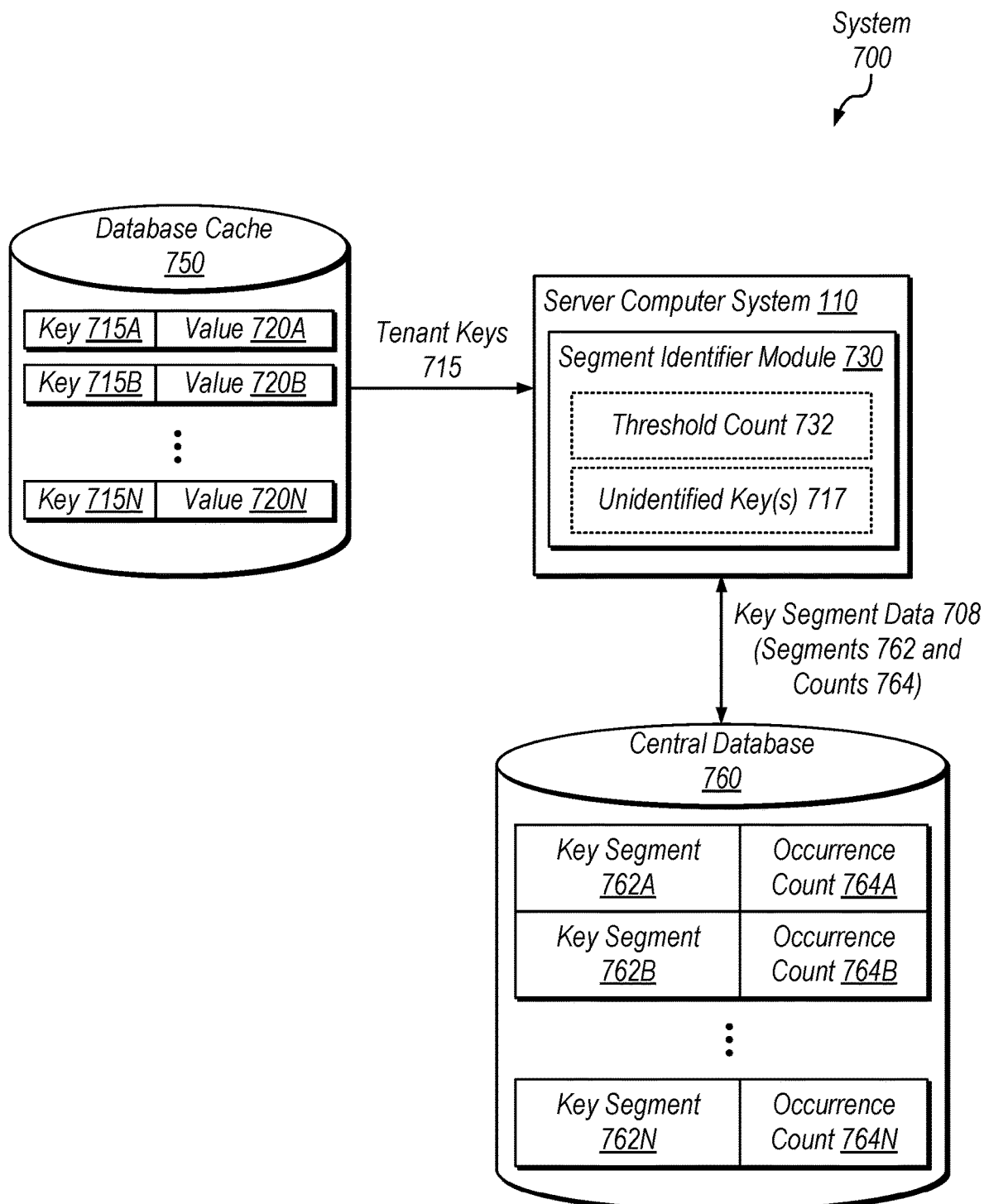
FIG. 7 is a block diagram illustrating an example system configured to identify tenants corresponding to keys having unidentified tenants, according to some embodiments.

FIG. 7 is a block diagram illustrating an example system configured to identify tenants corresponding to keys having unidentified tenants. In the illustrated embodiment, system 700 includes database cache 705, central database 760, and server computer system 110, which in turn includes segment identifier module 730. Note that keys that do not yet have a known corresponding tenants may be referred to herein as unidentified keys.

Server computer system 110, in the illustrated embodiment, retrieves tenant keys 715 from database cache 750. In some embodiments, server computer system 110 receives key-value entries from database cache 750. In some embodiments, server computer system 110 first performs the method 600 discuss in detail above with reference to FIGS. 1-6 to identify various tenants corresponding to one of more tenant keys 715. For example, system 110 may provide any keys having unidentified tenants after the performance of method 600 to segment identifier module 720. For example, in some situations, method 600 may not be able to identify tenants for approximately 12% of tenant keys 715. Server computer system 110 then executes segment identifier module 730 to identify tenants for one or more unidentified keys 717 (keys for which tenants have not yet been identified). In other embodiments, server computer system 110 performs segment identification techniques on tenant keys 715 without first performing method 600.

In order to separate individual segments from tenant keys 715, server computer system 110 executes segment identifier module 730 to process tenant keys 715 retrieved from database cache 750. For example, segment identifier module 730 separates keys of 715 of key-value entries of database cache 750 into a plurality of key segments 762. Module 730 performs the separating based on one or more delimiters included in the tenant keys 715. For example, tenant keys 715 include one or more delimiters separating different portions (i.e., segments) included in the keys. Delimiters may include one or more of the following types of delimiters: a comma, a period, a dash, a forward slash, a backward slash, a colon, a semi-colon, etc. Any of various types of sentence separators may be included as delimiters within keys of database cache 750. As used herein, the term "key segment" refers to a subset of a set of characters included in a given key, the subsets within the key being separated by delimiters. For example, a key "0x00000123/Tenant1-abc" includes the set of characters "0x00000123Tenant1abc" separated by delimiters "/" and "-". In this example, a first subset (segment) of the key includes characters "0x00000123," a second subset (segment) includes characters "Tenant1," while a third subset (segment) includes characters "abc."

Server computer system 110 may retrieve tenant keys (and entire key-value entries from cache 750) every hour, day, week, month, etc. As one specific example, server computer system 110 retrieves data from cache 750 once a week based on a maximum TTL values for keys in cache 750 being set to one week. After retrieving keys from cache 750 and separating key segments, server computer system 110 aggregates total occurrence counts for respective key segments. Server computer system 110, in the illustrated embodiment, stores key segment data 708 including key segments 762A-762N and segment occurrence counts 764A-764N in central database 760.

When executing segment identifier module 730 to identify tenants for unidentified key(s) 717, server computer system 110 retrieves occurrence counts 764 and key segments 762 from central database 760. Segment identifier module 730 compares the segment counts 764 to a threshold count 732. Based on one or more occurrence counts 764 satisfying the threshold count 732, module 730 selects key segments 762 corresponding to these occurrence counts 764 for comparison with segments of unidentified key(s) 717.

Segment identifier module 730 may select key segments having higher total occurrence counts relative to other key segments stored in central database 760. As one specific example, module 730 may select five hundred key segments from central database 760 based on these key segments having the top five hundred occurrence counts of key segments 762 stored in database 760. Note that the number of key segments selected for comparison with unidentified key(s) 717 is a tunable parameter (threshold count 732 is a tunable number). For example, threshold count 732 may be selected based on at least ten, twenty, thirty, etc. key segments having a greater count than this selected number. A system administrator may specify a particular number of key segments that should be compared against segments of unidentified keys and then system 110 selects the threshold count 732 based on this particular number and key segment occurrence counts in central database 760. For example, is a system administrator specifies that at least ten key segments need to be compared to segments of an unidentified key, system 110 determines that ten key segments stored in central database have an occurrence count of fifty or greater. Based on this determination, system 110 selects a threshold count 732 of fifty.

Based on comparing selected key segments having high occurrence counts, system 110 compares key segments of an unidentified key 717 to the selected key segments. A selected key segment that matches the key segment of the unidentified key 717 is used to identify a tenant for the unidentified key. For example, a system administrator may identify and assign a tenant to the unidentified key based on the key segment from central database 760 that matches a segment of the unidentified key. As another example, a trained machine learning model may evaluate the matching key segment to identify a tenant. An example of this identification is discussed in further detail below with reference to FIG. 9.

Central database 760 may be executed using Salesforce's Argus™ (a timeseries platform for storing and monitoring timeseries data) or Prometheus™ database. System 110 stores key segment data 708 directly in central database 760 as a timeseries. Central database 760 aggregates key segment data as it is queried and may return this aggregated data to system 110. Database 760 indexes key segment data by timestamp. For example, central database 760 may store a timeseries that includes a timestamp for a time at which key segment data was retrieved from database cache 750. This timeseries may also include key occurrence counts for various key segments as well as all key segment data for respective database cache instances (in situations in which database cache 750 is a distributed datastore having a plurality of instances as shown in FIG. 8 and described below).

Figure 8:
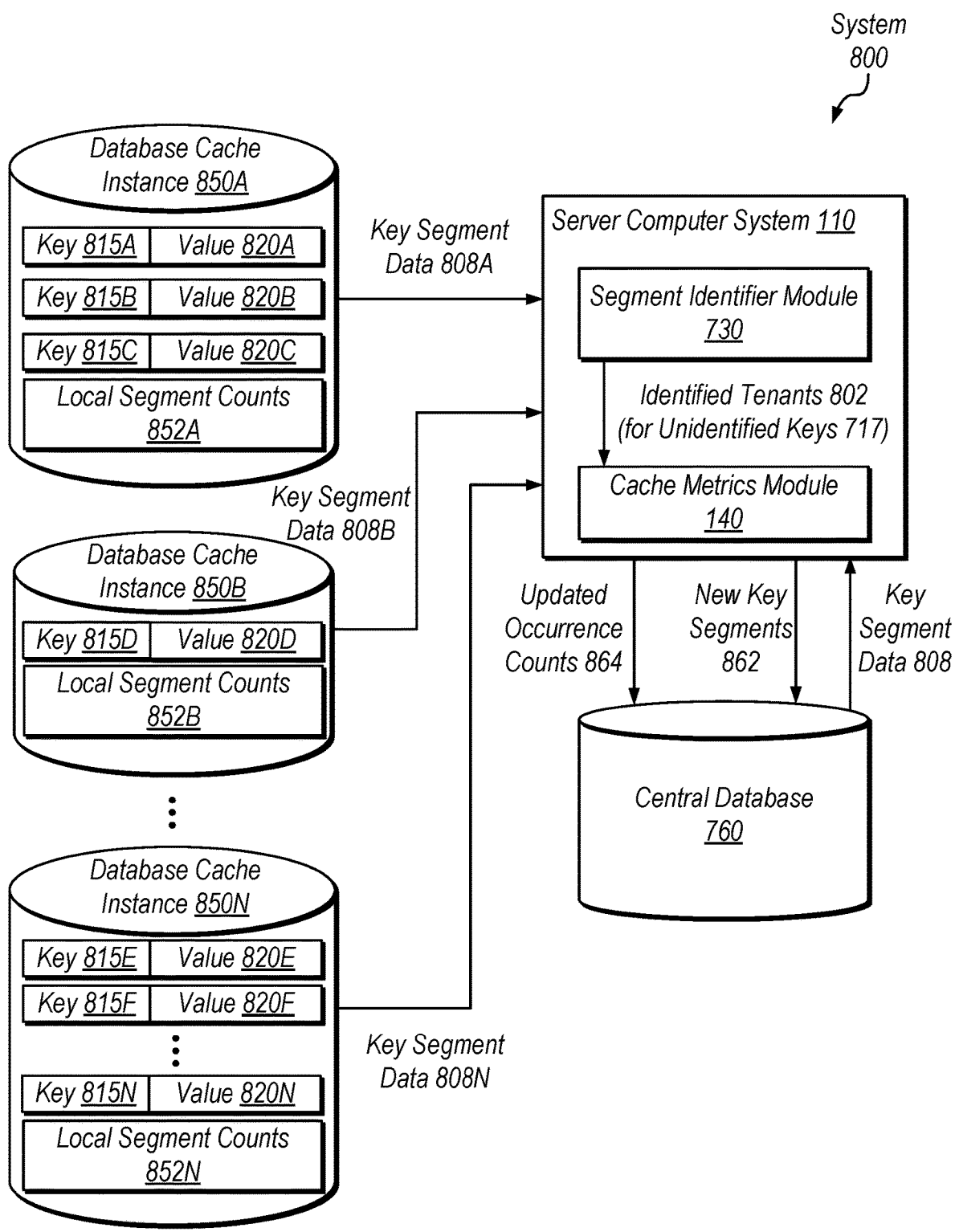
FIG. 8 is a block diagram illustrating an example system configured to identify tenants corresponding to keys with unidentified tenants based on key segments retrieved from a plurality of database cache instances, according to some embodiments.

Turning now to FIG. 8, a block diagram is shown illustrating an example system configured to identify tenants corresponding to keys with unidentified tenants based on key segments retrieved from a plurality of database cache instances. In the illustrated embodiment, system 800 includes database cache instances 850A-850N, central database 760, and server computer system 110, which in turn includes segment identifier module 730 and cache metrics module 140.

In the illustrated embodiment, database cache is a distributed datastore including several instances 850A-850N. Database cache instance 850A includes three different key-value entries with keys 815A-815C and values 820A-820C, and local segment counts 852A. For example, local segment counts 852A include occurrence counts for key segments included in keys 815A-815C. Database cache instance 850A, in the illustrated embodiment, transmits key segment data 808A to server computer system 100. For example, key segment data 808A may include keys 815A, individual segments included in keys 815A-815C and local counts 852A for respective segments included in keys 815A-815C. In some situations, server computer system 110 determines key segments included in keys 815 (and, in such situations, data 808A does not include respective key segments). In such situations, system 110 determines counts for segments it determines to be included in various keys received from instance 850A. In some embodiments, data 808A includes values 820A-820C as well as cache metadata for these key-value entries (i.e., hit/miss data for entries, TTL values, most recent accesses, etc.) to be used by system 110 (via execution of cache metrics module 140) to calculate cache usage metrics for tenants identified via the pattern matching techniques discussed above with reference to FIGS. 1-6 and/or via segment identifier module 730.

Similarly, in the illustrated embodiment database cache instance 850B includes a single key-value entry with key 815D and value 820D and local segment counts 852B for segments included in key 815D. Cache instance 850B transmits key segment data 808B to server computer system 110. This data 808B includes key 815D, value 820D, local segment counts 852B for segments included in key 815D, and cache metadata for instance 850B. Database cache instance 850N includes a plurality of keys 815E-815N and corresponding values 820E-820N, and local segment counts 852N for segments included in keys 815E-815N. Cache instance 850N transmits key segment data 808N to server computer system 110. Key segment data 808N includes keys 815E-815N, values 820E-820N, local segment counts 852N, and cache metadata for entries stored in instance 850N. In some embodiments, server computer system 110 maintains database cache instances 850. In other embodiments, another server system maintains instances 850 and server computer system 110 communicates with this other server system to obtain key segment data 808.

Instances 850 (or a server system executing instances 850) may aggregate local segment counts 852. As one specific example, instance 850A may determine that key segment "tenantA" has a local occurrence count of three, key segment "OrgA" has a local occurrence count of three and key segment "12345" has a local occurrence count of one. Similarly, instance 850B may determine that key segment "tenantA" has a local occurrence count of three, key segment "OrgB" has a local occurrence count of three, and key segment "54321" has a local occurrence count of one. In this specific example, after instances 850A and 850B transmit their local occurrence counts 852 and key segments to system 110, this system determines an aggregate (total occurrence count such as occurrence counts 764 shown in FIG. 7) for each key segment. In this specific example, system 110 determines that the following key segments have the following total occurrence counts: "tenantA"=six, "OrgA"=3, "OrgB"=3, "12345"=1, and "54321"=1. In this example, although the organization names are frequently occurring within a given database instance, aggregation of key segments across all database cache instances by system 110 causes key segments that actually identify tenants to outnumber key segments (such as Salesforce™ organization IDs) that do not identify a tenant.

Aggregation across the plurality of database instances may advantageously improve the accuracy with which keys are matched to tenants, which in turn allows cache usage metrics to be accurately calculated for these tenants in order to identify inefficiencies within the database cache. For example, different database cache instances might house different Salesforce™ organizations. As such, in this example, tenants with data stored in a given cache instance might choose to incorporate their Org ID in their keys. It is undesirable, however, for Org IDs to become a factor in identifying tenants corresponding to key-value entries in the cache. That is, it is undesirable for the disclosed system to aggregate occurrence keys for key segments including the Org IDs such that these key segments are selected for identifying tenants (due to these segments having a high occurrence count). In order to minimize the weight of instance-specific key segments (such as Org IDs), the disclosed techniques aggregate key segments across a plurality of database cache instances. Such techniques result in instance-specific key segments such as Org IDs having much lower occurrence counts than key segments indicative of tenants (which occur across multiple database cache instances and, therefore, have higher occurrence counts than key segments occurring only in a single cache instance).

Over time, as the data stored in cache instances 850 changes, server computer system 110 take total occurrence counts determined from local segment counts 852 included in newly received key segment data 808A and adds them to occurrence counts 764 already stored in central database 760 for corresponding key segments to generate updated occurrence counts 864 for various key segments. In the illustrated embodiment, server computer system 110 stores these total occurrence counts (i.e., updated occurrence counts 864) in central database 760. In some embodiments, server computer system 110 receives raw key segment data (that does not include local segment counts 852) from various instances 850 and determines total occurrence counts from individual key segment data. Server computer system 110, in the illustrated embodiment, stores new key segments 862 included in the received key segment data 808 from various cache instances 850 in central database 760 with total occurrence counts determined by system 110.

Server computer system 110 executes segment identifier module 730 to identify tenants corresponding to keys 815 included in instances 850 using the techniques described above with reference to FIG. 7. Segment identifier module 730, in the illustrated embodiment, sends identified tenants 802 for corresponding unidentified keys 717 to cache metrics module 140. Cache metrics module 140 then generates cache usage metrics for individual tenants based on the information from segment identifier module 730 indicating which tenants correspond to which database cache entries as well as key segment data 808 retrieved from central database 760 (including cache metadata for various entries). (The cache usage metrics generation performed by cache metrics module 140 is discussed in detail above with reference to FIGS. 1-6.)

Figure 9:
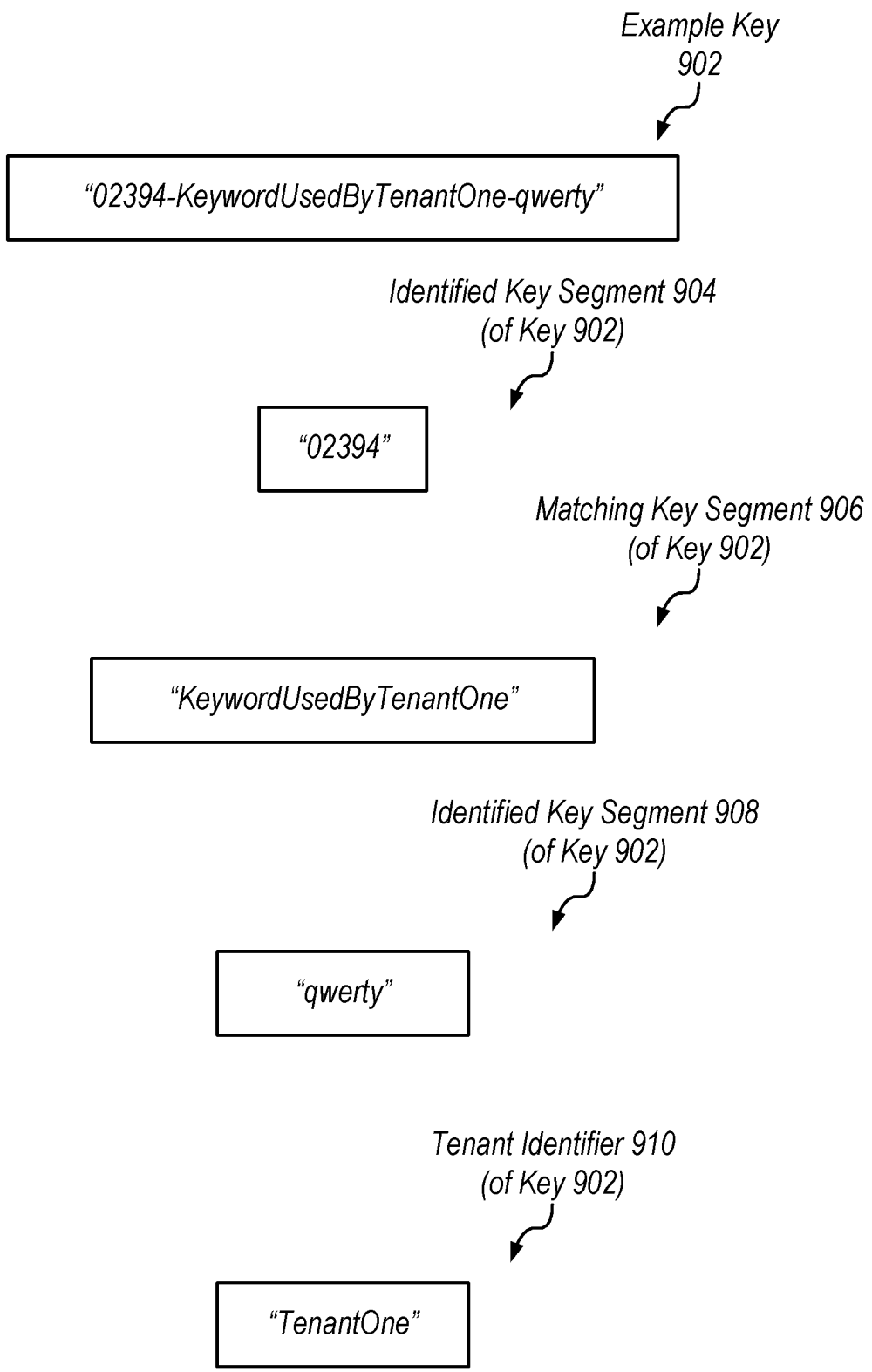
FIG. 9 is a diagram illustrating an example key with key segments, according to some embodiments.

Turning now to FIG. 9, an illustration is shown representing an example key 902 with several key segments 904, 906, 908, and tenant identifier 910. In the illustrated embodiment, example key 902 is "02394-KeywordUsedByTenantOne-qwerty" and includes the following key segments identified by segment identifier module 730: "02394," "KeywordUsedByTenantOne," "qwerty." Segment identifier module 730 further identifiers "KeywordUsedByTenantOne" as matching a key segment stored in central database 760 having an occurrence count matching threshold count 732. This key segment is then evaluated to determine that "TenantOne" is an identifier 910 of the tenant corresponding to example key 902. In this example, server computer system 110 may update the regular expression database (not shown in FIGS. 7-9) to include a mapping between the key pattern "TenantOne" and the corresponding tenant. In this example, although "KeywordUsedByTenantOne" is not an exact match with a tenant identifier, it includes information that maps one-to-one with a given tenant. In other situations, an identified key segment may not map one-to-one with a given tenant name; however, the identified key segment may include information indicative of a particular tenant (which can be identified by a system administrator, for example).

Example Method

FIG. 10 is a flow diagram illustrating a method 1000 for identifying a tenant corresponding to at least one unidentified key, according to some embodiments. The method shown in FIG. 10 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, server computer system 110 performs the elements of method 1000. In some embodiments, a system other than server computer system 110 performs the method 1000, while server computer system 110 performs the method 600. In such situations, server computer system 110 communicates with the other system in order to obtain identified tenants for keys having unidentified tenants after performance of the regular expression method 600 (e.g., system 110 may transmit unidentified keys to the other server for tenant identification).

At 1010, in the illustrated embodiment, a server computer system compares at least one key having an unidentified tenant with key segments having a number of occurrences within a database cache satisfying a threshold count, where the at least one key is included in a key-value entry of the database cache storing data for multiple tenants, and where a plurality of key segments and corresponding occurrence counts for the plurality of key segments are stored in a central database. In some embodiments, prior to the comparing, the server computer system: identifies tenants corresponding to respective ones of the key-value entries based on analyzing keys of key-value entries retrieved from the database cache, parses respective keys included in the key-value entries to determine one or more separate portions of the respective keys, and matches the one or more separate portions from respective keys to one or more known expressions included in a database of expressions corresponding to different tenants. For example, the server computer system may identify tenants corresponding to keys using regular expressions (pattern matching techniques discussed above with reference to FIGS. 1-6).

In some embodiments, the comparing is performed for one or more keys not having matching portions with known expressions. In some embodiments, the database of expressions is populated by: receiving tenants codes from a plurality of tenants at a time of registration of the tenants with a service provided by the server computer system and identifying one or more expressions corresponding to respective tenants based on the received tenant codes. In some embodiments, the server computer system updates, based on identifying a tenant corresponding to the at least one unidentified key, the database of expressions corresponding to different tenants, where the updating includes adding, to the database of expressions, an entry that includes at least portion of the matching key segment as a regular expression and the identified tenant. For example, the system may update the regular expression database when new mappings between key segments (expressions) and tenants are identified via the disclosed techniques. In some embodiments, the regular expression database and the central database 760 are the same database. For example, regular expressions may be stored in central database 760 in addition to key segments and occurrence counts for key segments.

In some embodiments, prior to comparing keys having unidentified tenants with key segments with high occurrence counts, the server computer system: retrieves a plurality of key-value entries from a plurality of cache instances of the database cache storing data for different tenants, determines a total occurrence count for respective key segments based on a number of occurrences of respective key segments included in keys of key-value entries across the plurality of cache instance, and stores the total occurrence counts for respective key segments in a central database. For example, the server computer system compiles total occurrence counts for key segments across various instances of the database cache. In some embodiments, the server computer system separates, for the plurality of key-value entries, keys into a plurality of key segments, where the separating is performed based on one or more delimiters included in the keys. Delimiters may also be referred to as punctuation separators.

At 1020, the server computer system determines, based on the comparing, whether the at least one unidentified key matches one of the key segments satisfying the threshold count. In some embodiments, the server computer system determines the threshold count by comparing occurrence counts for the plurality of key segments. In some embodiments, the server computer system selects, based on a predetermined number of key segments having an occurrence count greater than a particular occurrence count, the particular occurrence count as the threshold count. For example, the system may compare unidentified key segments to the top two hundred key segments (key segments having the top two hundred occurrence counts) stored in the central database.

At 1030, in response to the server computer system determining a match, a tenant corresponding to the at least one unidentified key is identified based on the matching key segment. For example, server computer system may feed the matching key segment into a machine learning model trained to identify tenants based on key segments. The trained model may output a tenant corresponding to the key segment and then server computer system assigns the identified tenant to the unidentified key (which has now been identified as belonging to a particular tenant). For example, the disclosed techniques might train a machine learning model to recognize patterns and identify which tenants own code corresponding to such patterns. In such situations, the disclosed techniques might index the code base for a given tenant and feed this code as well as a selected key segment having a threshold occurrence count through the trained machine learning model. The model might output whether the selected key segment matches a string or pattern included in the code base of this tenant. If there is a match, then this tenant is known to correspond to the key-value entry from which the key segment was selected. As another example, a system administrator may receive the matching key segment from server computer system (e.g., the system admin views the key segment via a user interface of their computing device) and identifies that the key segment corresponds to a given tenant. The system admin then communicates the identified tenant to the server computer system, which in turn assigns the identified tenant to the unidentified key.

In some embodiments, the server computer system generates, based on one or more identified tenants and cache metadata for key-value entries corresponding to the one or more identified tenants, current usage statistics for the database cache. In some embodiments, the server computer system determines, based on the current usage statistics for the database cache, whether to adjust one or more operation parameters of the database cache.

Exemplary Multi-Tenant Database System

Figure 11:
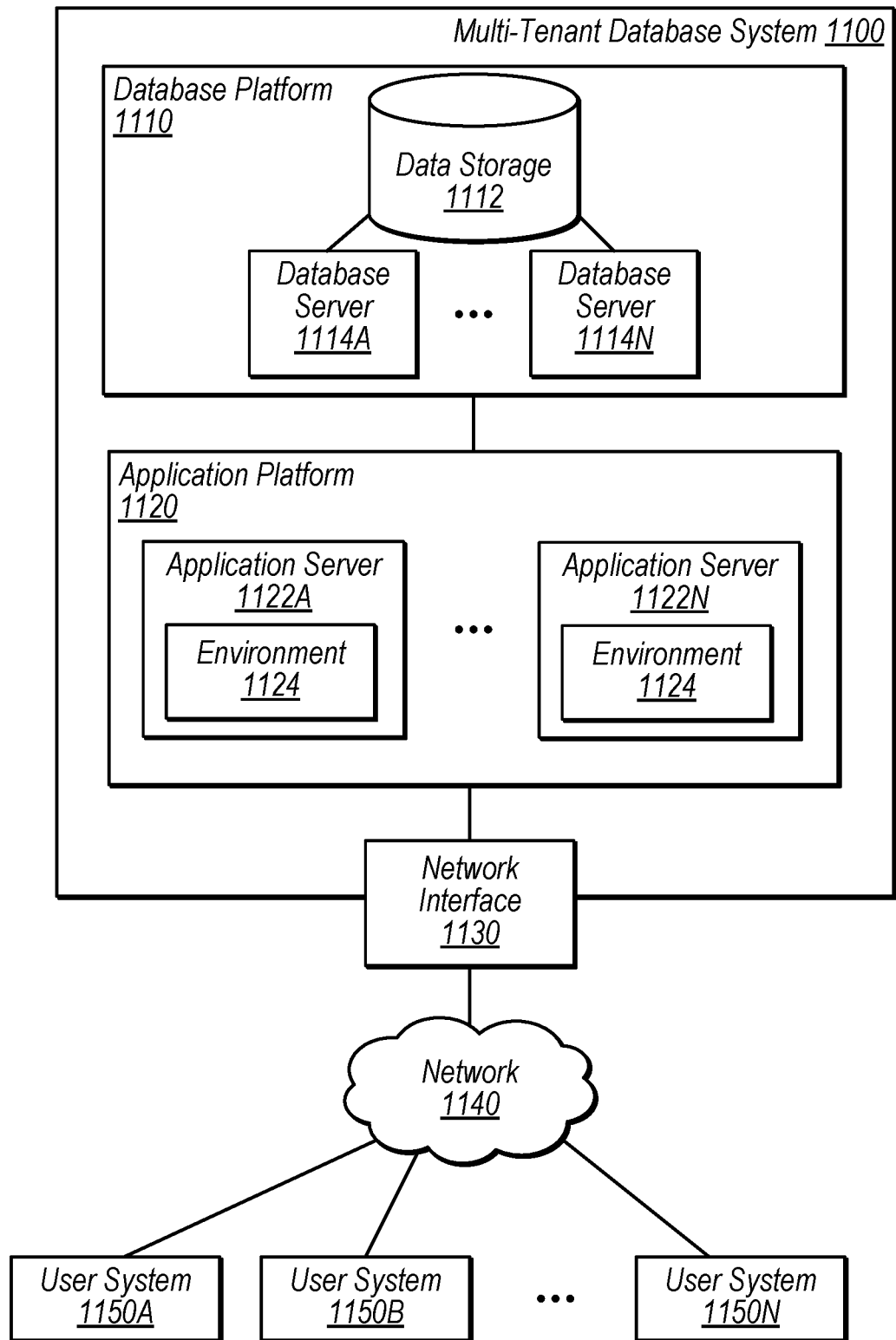
FIG. 11 is a block diagram illustrating elements of a multi-tenant system corresponding to the system described in the present disclosure, according to some embodiments.

Turning now to FIG. 11, an exemplary multi-tenant database system (MTS) 1100 in which various techniques of the present disclosure can be implemented is shown—e.g., system 100 or system 700 may be MTS 1100. In FIG. 11, MTS 1100 includes a database platform 1110, an application platform 1120, and a network interface 1130 connected to a network 1140. Also as shown, database platform 1110 includes a data storage 1112 and a set of database servers 1114A-N that interact with data storage 1112, and application platform 1120 includes a set of application servers 1122A-N having respective environments 1124. In the illustrated embodiment, MTS 1100 is connected to various user systems 1150A-N through network 1140. The disclosed multi-tenant system is included for illustrative purposes and is not intended to limit the scope of the present disclosure. In other embodiments, techniques of this disclosure are implemented in non-multi-tenant environments such as client/server environments, cloud computing environments, clustered computers, etc.

MTS 1100, in various embodiments, is a set of computer systems that together provide various services to users (alternatively referred to as "tenants") that interact with MTS 1100. In some embodiments, MTS 1100 implements a customer relationship management (CRM) system that provides mechanism for tenants (e.g., companies, government bodies, etc.) to manage their relationships and interactions with customers and potential customers. For example, MTS 1100 might enable tenants to store customer contact information (e.g., a customer's website, email address, telephone number, and social media data), identify sales opportunities, record service issues, and manage marketing campaigns. Furthermore, MTS 1100 may enable those tenants to identify how customers have been communicated with, what the customers have bought, when the customers last purchased items, and what the customers paid. To provide the services of a CRM system and/or other services, as shown, MTS 1100 includes a database platform 1110 and an application platform 1120.

Database platform 1110, in various embodiments, is a combination of hardware elements and software routines that implement database services for storing and managing data of MTS 1100, including tenant data. As shown, database platform 1110 includes data storage 1112. Data storage 1112, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data storage 1112 is used to implement a database (e.g., database cache 150 or database cache 750) comprising a collection of information that is organized in a way that allows for access, storage, and manipulation of the information. Data storage 1112 may implement a single database, a distributed database, a collection of distributed databases, a database with redundant online or offline backups or other redundancies, etc. As part of implementing the database, data storage 1112 may store files (e.g., database files including various ones of key-value entries 130) that include one or more database records having respective data payloads (e.g., values for fields of a database table) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 1100 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that one tenant does not have access to another tenant's data, unless such data is expressly shared.

In some embodiments, the data stored at data storage 1112 is organized as part of a log-structured merge-tree (LSM tree). An LSM tree normally includes two high-level components: an in-memory buffer and a persistent storage. In operation, a database server 1114 may initially write database records into a local in-memory buffer before later flushing those records to the persistent storage (e.g., data storage 1112). As part of flushing database records, the database server 1114 may write the database records into new files that are included in a "top" level of the LSM tree. Over time, the database records may be rewritten by database servers 1114 into new files included in lower levels as the database records are moved down the levels of the LSM tree. In various implementations, as database records age and are moved down the LSM tree, they are moved to slower and slower storage devices (e.g., from a solid-state drive to a hard disk drive) of data storage 1112.

When a database server 1114 wishes to access a database record for a particular key, the database server 1114 may traverse the different levels of the LSM tree for files that potentially include a database record for that particular key. If the database server 1114 determines that a file may include a relevant database record, the database server 1114 may fetch the file from data storage 1112 into a memory of the database server 1114. The database server 1114 may then check the fetched file for a database record having the particular key. In various embodiments, database records are immutable once written to data storage 1112. Accordingly, if the database server 1114 wishes to modify the value of a row of a table (which may be identified from the accessed database record), the database server 1114 writes out a new database record to the top level of the LSM tree. Over time, that database record is merged down the levels of the LSM tree. Accordingly, the LSM tree may store various database records for a database key where the older database records for that key are located in lower levels of the LSM tree then newer database records.

Database servers 1114, in various embodiments, are hardware elements, software routines, or a combination thereof capable of providing database services, such as data storage, data retrieval, and/or data manipulation. A database server 1114 may correspond to database node 160. Such database services may be provided by database servers 1114 to components (e.g., application servers 1122) within MTS 1100 and to components external to MTS 1100. As an example, a database server 1114 may receive a database transaction request from an application server 1122 that is requesting data to be written to or read from data storage 1112. The database transaction request may specify an SQL SELECT command to select one or more rows from one or more database tables. The contents of a row may be defined in a database record and thus database server 1114 may locate and return one or more database records that correspond to the selected one or more table rows. In various cases, the database transaction request may instruct database server 1114 to write one or more database records for the LSM tree—database servers 1114 maintain the LSM tree implemented on database platform 1110. In some embodiments, database servers 1114 implement a relational database management system (RDMS) or object-oriented database management system (OODBMS) that facilitates storage and retrieval of information against data storage 1112. In various cases, database servers 1114 may communicate with each other to facilitate the processing of transactions. For example, database server 1114A may communicate with database server 1114N to determine if database server 1114N has written a database record into its in-memory buffer for a particular key.

Application platform 1120, in various embodiments, is a combination of hardware elements and software routines that implement and execute CRM software applications as well as provide related data, code, forms, web pages and other information to and from user systems 1150 and store related data, objects, web page content, and other tenant information via database platform 1110. In order to facilitate these services, in various embodiments, application platform 1120 communicates with database platform 1110 to store, access, and manipulate data. In some instances, application platform 1120 may communicate with database platform 1110 via different network connections. For example, one application server 1122 may be coupled via a local area network and another application server 1122 may be coupled via a direct network link. Transfer Control Protocol and Internet Protocol (TCP/IP) are exemplary protocols for communicating between application platform 1120 and database platform 1110, however, it will be apparent to those skilled in the art that other transport protocols may be used depending on the network interconnect used.

Application servers 1122, in various embodiments, are hardware elements, software routines, or a combination thereof capable of providing services of application platform 1120, including processing requests received from tenants of MTS 1100. Application servers 1122, in various embodiments, can spawn environments 1124 that are usable for various purposes, such as providing functionality for developers to develop, execute, and manage applications (e.g., business logic). Data may be transferred into an environment 1124 from another environment 1124 and/or from database platform 1110. In some cases, environments 1124 cannot access data from other environments 1124 unless such data is expressly shared. In some embodiments, multiple environments 1124 can be associated with a single tenant.

Application platform 1120 may provide user systems 1150 access to multiple, different hosted (standard and/or custom) applications, including a CRM application and/or applications developed by tenants. In various embodiments, application platform 1120 may manage creation of the applications, testing of the applications, storage of the applications into database objects at data storage 1112, execution of the applications in an environment 1124 (e.g., a virtual machine of a process space), or any combination thereof. In some embodiments, application platform 1120 may add and remove application servers 1122 from a server pool at any time for any reason, there may be no server affinity for a user and/or organization to a specific application server 1122. In some embodiments, an interface system (not shown) implementing a load balancing function (e.g., an F5 Big-IP load balancer) is located between the application servers 1122 and the user systems 1150 and is configured to distribute requests to the application servers 1122. In some embodiments, the load balancer uses a least connections algorithm to route user requests to the application servers 1122. Other examples of load balancing algorithms, such as a round robin and observed response time, also can be used. For example, in certain embodiments, three consecutive requests from the same user could hit three different servers 1122, and three requests from different users could hit the same server 1122.

In some embodiments, MTS 1100 provides security mechanisms, such as encryption, to keep each tenant's data separate unless the data is shared. If more than one server 1114 or 1122 is used, they may be located in close proximity to one another (e.g., in a server farm located in a single building or campus), or they may be distributed at locations remote from one another (e.g., one or more servers 1114 located in city A and one or more servers 1122 located in city B). Accordingly, MTS 1100 may include one or more logically and/or physically connected servers distributed locally or across one or more geographic locations.

One or more users (e.g., via user systems 1150) may interact with MTS 1100 via network 1140. User system 1150 may correspond to, for example, a tenant of MTS 1100, a provider (e.g., an administrator) of MTS 1100, or a third party. Each user system 1150 may be a desktop personal computer, workstation, laptop, PDA, cell phone, or any Wireless Access Protocol (WAP) enabled device or any other computing device capable of interfacing directly or indirectly to the Internet or other network connection. User system 1150 may include dedicated hardware configured to interface with MTS 1100 over network 1140. User system 1150 may execute a graphical user interface (GUI) corresponding to MTS 1100, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 1150 to access, process, and view information and pages available to it from MTS 1100 over network 1140. Each user system 1150 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 1100 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 1150 may be users in differing capacities, the capacity of a particular user system 1150 might be determined based on one or more permission levels associated with the current user. For example, when a salesperson is using a particular user system 1150 to interact with MTS 1100, that user system 1150 may have capacities (e.g., user privileges) allotted to that salesperson. But when an administrator is using the same user system 1150 to interact with MTS 1100, the user system 1150 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 1100 that are allocated at the tenant level while other data structures are managed at the user level.

In some embodiments, a user system 1150 and its components are configurable using applications, such as a browser, that include computer code executable on one or more processing elements. Similarly, in some embodiments, MTS 1100 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VBScript.

Network 1140 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 1150 may communicate with MTS 1100 using TCP/IP and, at a higher network level, use other common Internet protocols to communicate, such as HTTP, FTP, AFS, WAP, etc. For example, where HTTP is used, user system 1150 might include an HTTP client commonly referred to as a "browser" for sending and receiving HTTP messages from an HTTP server at MTS 1100. Such a server might be implemented as the sole network interface between MTS 1100 and network 1140, but other techniques might be used as well or instead. In some implementations, the interface between MTS 1100 and network 1140 includes load sharing functionality, such as round-robin HTTP request distributors to balance loads and distribute incoming HTTP requests evenly over a plurality of servers.

In various embodiments, user systems 1150 communicate with application servers 1122 to request and update system-level and tenant-level data from MTS 1100 that may require one or more queries to data storage 1112. In some embodiments, MTS 1100 automatically generates one or more SQL statements (the SQL query) designed to access the desired information. In some cases, user systems 1150 may generate requests having a specific format corresponding to at least a portion of MTS 1100. As an example, user systems 1150 may request to move data objects into a particular environment 1124 using an object notation that describes an object relationship mapping (e.g., a JavaScript object notation mapping) of the specified plurality of objects.

Exemplary Computer System

Figure 12:
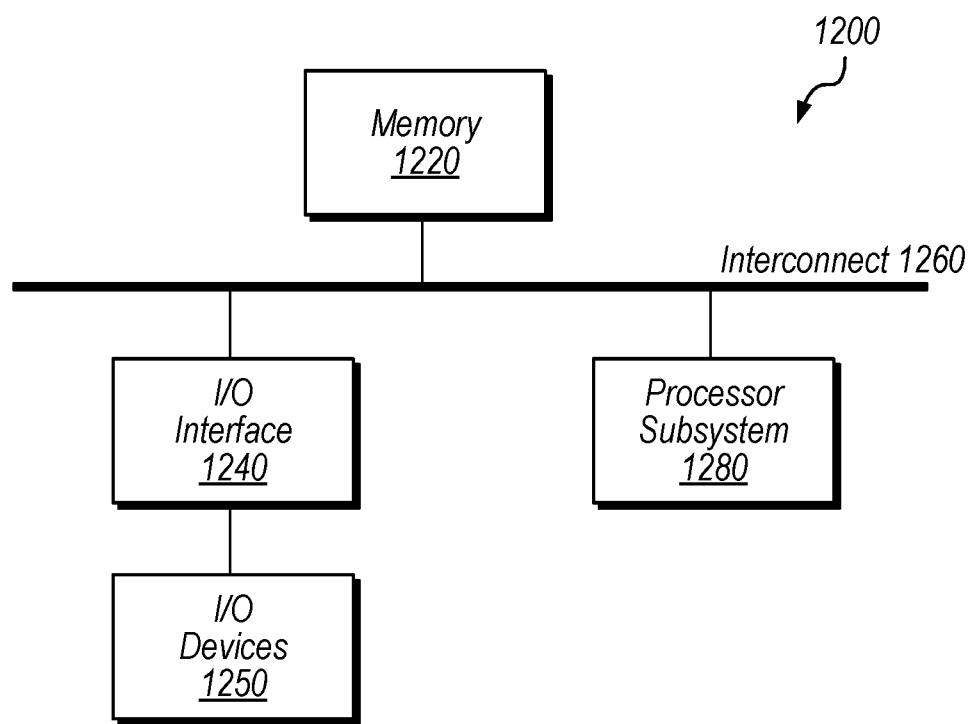
FIG. 12 is a block diagram illustrating elements of a computer system for implementing various systems described in the present disclosure.

Turning now to FIG. 12, a block diagram of an exemplary computer system 1200, which may implement server computer system 110, database cache 150, database cache 750, central database 760, and one or more of tenant computing devices 120, and/or MTS 1100, is depicted. Computer system 1200 includes a processor subsystem 1280 that is coupled to a system memory 1220 and I/O interfaces(s) 1240 via an interconnect 1260 (e.g., a system bus). I/O interface(s) 1240 is coupled to one or more I/O devices 1250. Although a single computer system 1200 is shown in FIG. 12 for convenience, system 1200 may also be implemented as two or more computer systems operating together.

Processor subsystem 1280 may include one or more processors or processing units. In various embodiments of computer system 1200, multiple instances of processor subsystem 1280 may be coupled to interconnect 1260. In various embodiments, processor subsystem 1280 (or each processor unit within 1280) may contain a cache or other form of on-board memory.

System memory 1220 is usable store program instructions executable by processor subsystem 1280 to cause system 1200 perform various operations described herein. System memory 1220 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 1200 is not limited to primary storage such as memory 1220. Rather, computer system 1200 may also include other forms of storage such as cache memory in processor subsystem 1280 and secondary storage on I/O devices 1250 (e.g., a hard drive, storage array, etc.). In some embodiments, these other forms of storage may also store program instructions executable by processor subsystem 1280. In some embodiments, program instructions that when executed implement pattern matching module 370, cache metrics module 140, segment identifier module 730 may be included/stored within system memory 1220.

I/O interfaces 1240 may be any of various types of interfaces configured to couple to and communicate with other devices, according to various embodiments. In one embodiment, I/O interface 1240 is a bridge chip (e.g., Southbridge) from a front-side to one or more back-side buses. I/O interfaces 1240 may be coupled to one or more I/O devices 1250 via one or more corresponding buses or other interfaces. Examples of I/O devices 1250 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1200 is coupled to a network via a network interface device 1250 (e.g., configured to communicate over Wi-Fi, Bluetooth, Ethernet, etc.).

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third," when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A method, comprising:
   retrieving, by a server computer system from a database cache storing data for different tenants, a set of key-value entries and cache metadata for the set of key-value entries;
   identifying, by the server computer system based on analyzing keys of key-value entries, tenants corresponding to respective ones of the set of key-value entries, wherein the identifying includes:
     parsing respective keys included in the set of key-value entries retrieved from the database cache to determine two or more separate portions of the respective keys; and
     matching the two or more separate portions from respective keys to one or more known expressions included in a database of expressions corresponding to different tenants;
   generating, by the server computer system based on the identified tenants and cache metadata for cache entries corresponding to the identified tenants, current usage metrics for the database cache; and
   determining, by the server computer system based on the current usage metrics for the database cache, whether to adjust one or more operation parameters of the database cache.

2. The method of claim 1, wherein the two or more separate portions parsed from respective keys are two or more expressions, and wherein the two or more expressions are one or more of the following types of expressions: terms, prefixes, and suffixes.

3. The method of claim 1, wherein the database of expressions is populated by:
   receiving, from a plurality of tenants at a time of registration of the tenants with a service provided by the server computer system, tenant codes; and
   identifying, based on the received tenant codes, one or more expressions corresponding to respective tenants.

4. The method of claim 1, wherein the retrieving is performed by:
   placing a proxy between the database cache and cache client, wherein the cache client provides access to the database cache to a plurality of tenant computing devices, and wherein the proxy stores a copy of database operations requested by the plurality of tenant computing devices and performed by the cache client.

5. The method of claim 1, wherein the retrieving is performed by:
   monitoring, using an extensible server, database operations performed on the database cache; and
   periodically transmitting, from the extensible server to the server computer system, the monitored database operations, wherein the retrieving is performed based on the monitored database operations.

6. The method of claim 1, wherein the retrieving is performed by:
   generating a replica of the database cache; and
   pushing a plurality of requested database operations performed on the database cache to the replica of the database cache, wherein retrieving the set of key-value entries and cache metadata includes retrieving information from the replica of the database cache.

7. The method of claim 1, further comprising:
   adjusting, based on the determining, one or more types of the following types of operation parameters of the database cache for one or more of the identified tenants: usable amount of space, time-to-live values, evictions, and throttling.

8. The method of claim 1, wherein the server computer system is a multi-tenant database system, and wherein the operations further comprise:
   transmitting, by the multi-tenant database system to a computing device of a first tenant of the multi-tenant database system, instructions for altering one or more internal parameters of the first tenant specifying allowable cache usage for the first tenant, wherein the instructions are generated based on the current usage metrics for the database cache corresponding to the first tenant.

9. The method of claim 1, wherein the server computer system is a multi-tenant database system, and wherein generating current usage metrics for the database cache includes:
   aggregating, for respective tenants of the multi-tenant database system, current usage metrics; and
   periodically updating, based on retrieving one or more additional sets of key-value entries, the aggregated current usage metrics for respective ones of the tenants.

10. A non-transitory computer-readable medium having program instructions stored thereon that are capable of causing a computer system to perform operations comprising:
    retrieving, by a server computer system from a database cache storing data for different tenants, a set of key-value entries and cache metadata for the set of key-value entries;
    identifying, by the server computer system based on analyzing keys of key-value entries, tenants corresponding to respective ones of the set of key-value entries, wherein the identifying includes:
      parsing respective keys included in the set of key-value entries retrieved from the database cache to determine two or more separate portions of the respective keys; and
      matching the two or more separate portions from respective keys to one or more known expressions included in a database of expressions corresponding to different tenants;
    generating, by the server computer system based on the identified tenants and cache metadata for cache entries corresponding to the identified tenants, current usage statistics for the database cache; and
    determining, by the server computer system based on the current usage statistics for the database cache, whether to adjust one or more operation parameters of the database cache.

11. The non-transitory computer-readable medium of claim 10, wherein the two or more separate portions parsed from respective keys are two or more expressions, and wherein the two or more expressions are one or more expressions of the following types of expressions: terms, prefixes, and suffixes.

12. The non-transitory computer-readable medium of claim 10, wherein the database of expressions is populated by:
receiving, from a plurality of tenants at a time of registration of the tenants with a service provided by the server computer system, tenant codes; and
identifying, based on the received tenant codes, one or more expressions corresponding to respective tenants.

13. The non-transitory computer-readable medium of claim 10, wherein the retrieving is performed by generating a replica of the database cache, including performing database operations submitted by different tenants on both the database cache and the replica of the database cache.

14. The non-transitory computer-readable medium of claim 10, wherein the operations further comprise:
adjusting, based on the determining, one or more of the following types of operation parameters of the database cache for one or more of the identified tenants: usable amount of space, time-to-live values, evictions, and throttling.

15. The non-transitory computer-readable medium of claim 10, wherein the server computer system is a multi-tenant database system, and wherein the operations further comprise:
transmitting, by the multi-tenant database system to a computing device of a first tenant of the multi-tenant database system, instructions for altering one or more internal parameters of the first tenant specifying allowable cache usage for the first tenant, wherein the instructions are generated based on the current usage statistics for the database cache corresponding to the first tenant.

16. A system, comprising:
at least one processor; and
memory having program instructions stored thereon that are executable by the at least one processor to cause the system to perform operations comprising:
retrieving, from a database cache storing data for different tenants, a set of key-value entries and cache metadata for the set of key-value entries;
identifying, based on analyzing keys of key-value entries, tenants corresponding to respective ones of the set of key-value entries, wherein the identifying includes:
parsing respective keys included in the set of key-value entries retrieved from the database cache to determine two or more separate portions of the respective keys; and
matching the two or more separate portions from respective keys to one or more known expressions included in a database of expressions corresponding to different tenants;
generating, based on the identified tenants and cache metadata for cache entries corresponding to the identified tenants, current usage statistics for the database cache; and
determining, based on the current usage statistics for the database cache, whether to adjust one or more operation parameters of the database cache.

17. The system of claim 16, wherein the two or more separate portions parsed from respective keys are two or more expressions, and wherein the two or more expressions are one or more expressions of the following types of expressions: terms, prefixes, and suffixes.

18. The system of claim 16, wherein the database of expressions is populated by:
receiving, from a plurality of tenants at a time of registration of the tenants with a service provided by the system, tenant codes; and
identifying, based on the received tenant codes, one or more expressions corresponding to respective tenants.

19. The system of claim 16, wherein the retrieving is performed using an extensible server that monitors database operations performed by the database cache for tenant computing devices.

20. The system of claim 16, wherein the retrieving is performed by:
generating a replica of the database cache; and
pushing a plurality of requested database operations performed on the database cache to the replica of the database cache, wherein retrieving the set of key-value entries and cache metadata includes retrieving information from the replica of the database cache.

* * * * *